United States Patent [19]

Carley

[11] Patent Number: 5,109,283
[45] Date of Patent: Apr. 28, 1992

[54] RASTER SCANNING ENGINE DRIVER WHICH INDEPENDENTLY LOCATES ENGINE DRIVE SIGNAL TRANSISTORS WITHIN EACH CELL AREA

[75] Inventor: Adam L. Carley, Windham, N.H.

[73] Assignee: Xerographic Laser Images Corporation, Woburn, Mass.

[21] Appl. No.: 663,402

[22] Filed: Mar. 1, 1991

Related U.S. Application Data

[63] Continuation-in-part of Ser. No. 487,540, Mar. 2, 1990.

[51] Int. Cl.[5] .................. H04N 1/21; H04N 1/23; H04N 1/40
[52] U.S. Cl. ........................... 358/298; 358/296; 358/459
[58] Field of Search ............... 358/296, 298, 458, 459

[56] References Cited

U.S. PATENT DOCUMENTS

| | | | |
|---|---|---|---|
| 3,916,096 | 10/1975 | Everett et al. | 358/456 |
| 4,149,183 | 4/1979 | Pellar et al. | 358/459 X |
| 4,626,923 | 12/1986 | Yoshida | 358/459 |
| 4,782,398 | 11/1988 | Mita | 358/298 X |
| 4,800,442 | 1/1989 | Riseman et al. | 358/459 |
| 4,864,419 | 9/1989 | Saito et al. | 358/298 X |
| 4,926,248 | 5/1990 | Kobayashi et al. | 358/459 X |
| 4,987,495 | 1/1991 | Arai | 358/458 X |

Primary Examiner—Benjamin R. Fuller
Assistant Examiner—Eric Frahm
Attorney, Agent, or Firm—Iandiorio & Dingman

[57] ABSTRACT

A raster print engine driver for generating from incoming data representative of a continuous tone or text image, a transition-modulated engine drive signal for causing the engine to reproduce the image as a series of modulated print lines, in which the driver establishes a cell scan time period representing the horizontal length along a print line of an elemental cell print area, and generates from the incoming data in the cell at least zero or two independently located drive signal transitions which cause the print engine to change state at selected points along the print lines to closely reproduce the image.

46 Claims, 17 Drawing Sheets

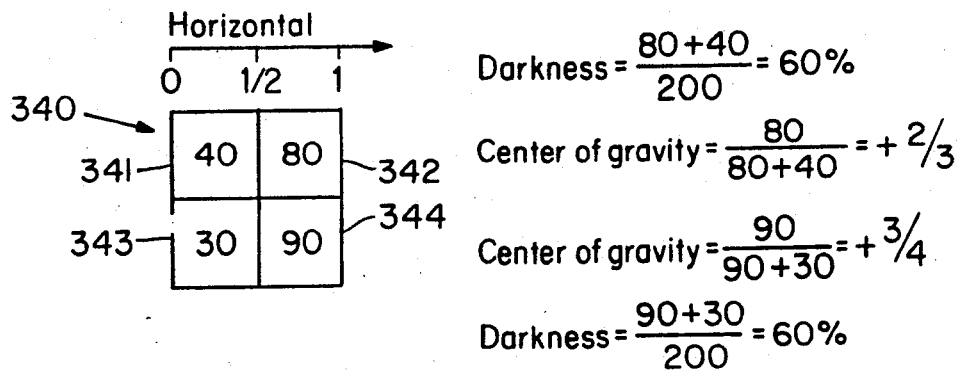
Fig. 13
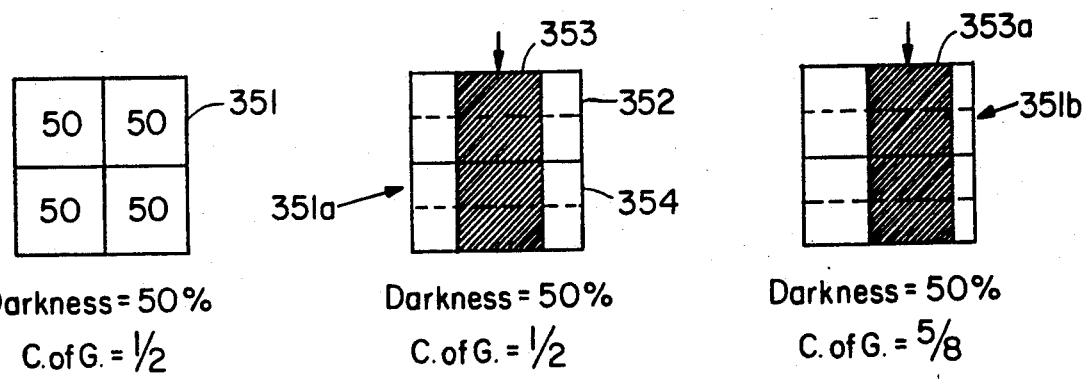
Fig. 14A  Fig. 14B  Fig. 14C
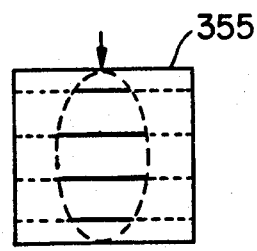 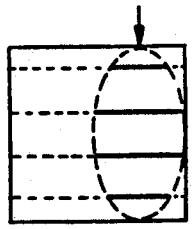 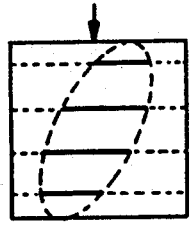
Fig. 15A  Fig. 15B  Fig. 15C

RASTER SCANNING ENGINE DRIVER WHICH INDEPENDENTLY LOCATES ENGINE DRIVE SIGNAL TRANSISTORS WITHIN EACH CELL AREA

RELATED APPLICATIONS

This application is a continuation-in-part of my U.S. patent application Ser. No. 07/487,540, filed Mar. 2, 1990.

FIELD OF INVENTION

This invention relates to a raster print engine driver particularly suited for high resolution halftone dot and text printing.

BACKGROUND OF INVENTION

The best current methods of reproducing images of halftones pulse-width-modulate the digital video signal used to drive the raster print engine that reproduces the image. The image may be reproduced using either halftone dots or vertical lines of varying width to create the gray scale.

U.S. Pat. No. 4,800,442 discloses a line screen apparatus in which the raster print engine drive signal is pulse-width-modulated by comparison of an analog video data signal to a sawtooth wave form. The analog signals are derived from lookup tables addressed by the digital input signals, typically 600×600 dpi bitmaps. Another example of such a pulse-width-modulation technique is disclosed in U.S. Pat. No. 3,916,096.

There are several problems with these pulse width modulation techniques which have prevented them from creating high quality image reproductions. Typically, the sawtooth pattern has the same period as the pixels. An analog video signal, having a discrete value in each pixel time period, is then compared to the sawtooth for generating the pulse-width-modulated signal. However, because the sawtooth is symmetric and the analog signal is single-valued, the digital video signal pulses are of necessity centered within each pixel, creating printed lines or dots which are also of necessity centered in the pixels. These pulse-width modulation print engine drivers thus can not alter the position of the printed line segment within the pixel area nor can they alter the center of gravity of the part of the image reproduced in a pixel. Accordingly, such systems do not have the flexibility to reproduce with great precision either halftone images or continuous-tone text and line art images.

Another problem which greatly affects the image quality of these systems is their method of establishing line-to-line synchronization of the video signal supplied to the raster scanning print engine, critical for high quality images. Horizontal synchronization is accomplished in U.S. Pat. No. 4,800,442 by comparing a seventy-two MHz reference clock signal to the horizontal sync signal generated by the laser printer beam detector to enable generation of pixel clock timing signals at a frequency of 18 MHz. However, this technique results in a line-to-line synchronization error of up to 25% of the pixel clock period, resulting in significant horizontal jitter. In addition, the high frequency reference is a potential source of RFI in the system.

The combination of the symmetric nature of the pulse width modulated digital video signals and the horizontal jitter of the known halftone image reproduction techniques has significantly limited the quality of the reproduced image. As a result, there exists a need for relatively inexpensive, high-quality halftone image reproduction apparatus.

SUMMARY OF INVENTION

It is therefore an object of this invention to provide an extremely high resolution raster print engine driver.

It is a further object of this invention to provide such a driver which modulates the raster print engine drive signal to create independently-locatable signal transitions with great precision within a cell print area.

It is a further object of this invention to provide such a driver in which the transitions can occur zero, one, two or three times per cell print area.

It is a further object of this invention to provide such a driver in which the transitions can occur at hundreds of locations in each cell print area.

It is a further object of this invention to provide such a driver in which the horizontal line to line synchronization is extremely precise.

It is a further object of this invention to provide such a driver which can reproduce the center of gravity of the input image data within a cell.

It is a further object of this invention to provide such a driver which can displace the printed halftone dot horizontally or diagonally to more closely reproduce an image.

This invention results from the realization that the effective resolution of raster print engines can be dramatically and inexpensively increased by transition modulating the video signal up to three times per elemental cell print area.

This invention features a raster print engine driver for generating, from incoming data representative of an image, a transition-modulated engine drive signal or signals for causing the engine to reproduce the image as a series of modulated print lines in which the driver includes means for establishing a cell scan time period representing the horizontal length along the print line of an elemental cell print area, and means for generating from the incoming data in said cell scan time period at least zero or two, and preferably one as well, independently located drive signal transitions to cause the print engine to change state at selected points along the print line for closely reproducing the image. The driver may reproduce halftone or continuous tone images as well as text or line art, and may produce halftone dots from a continuous tone image.

In a preferred embodiment, the drive signal transitions are locatable with the precision of at least 1/64th, and preferably 1/256th, of the cell scan time; the cell print area is preferably approximately 1/150 of an inch long. In alternative preferred embodiments, the print engine driver generates between zero and two independently located drive transitions and a third transition per cell, and allows for variable cell scan times to permit cell width scaling for changing the image size.

In a digital embodiment of the driver, the means for generating the drive signal transitions includes a digital clock for providing clocking signals having a clocking period. Further included may be a plurality of delays, such as lumped LC constants, one-shot multivibrators and/or inherent circuit delays, for generating from the clock signal a plurality of sequentially spaced clock phase signals having leading and trailing edges. In that case, the embodiment may further include logic circuit means for generating, from the clock phases and the incoming data, drive signal transitions independently locatable within a clocking period. This may be accomplished with a digital counter for producing a digital ramp signal along with means for comparing the incoming data to the digital ramp signal to establish a drive signal transition time window within the cell scan time period. In that case, there may further be included means for selecting with the incoming data one of the clock phase signals to resolve a drive signal transition time within the established window. The means for selecting a clock phase signal may include means for choosing the leading or trailing edge of the selected clock phase signal to fully define the drive signal transition time.

The variable cell scan times may be accomplished by including means for resetting and restarting the digital ramp signal when it reaches a selected value to end one cell scan time period and begin the next. The digital ramp may be generated in gray code to prevent momentary false comparisons.

In this preferred embodiment, the print engine driver further includes means for synchronizing the engine drive signal to the raster print engine horizontal synchronization signal, which may be accomplished by resetting the digital counter at the horizontal synchronization signal time.

In one embodiment of the driver, the incoming data is a digital representation of an image of text or line art, in which case the means for generating may include means for reproducing by drive signal transition placement the amount of image darkness and the horizontal center of gravity of the image darkness within each cell print area. In one such embodiment, consideration is given to the fact that the cell print areas overlap vertically, and the image darkness in the cell print area overlapping areas are reproduced in both overlapping cell print areas.

The digital input data may be a bitmap having twice the resolution of the raster print engine. In that case, the transitions in a cell print area may be generated from parts of three horizontal lines of the bitmap; the driver may weight the bits of the parts of the three horizontal lines of the bitmap from which the transitions are generated. This weighting may be accomplished by weighting the center bitmap line more than the outer two lines.

In those and other embodiments, the incoming data may include data representative of image outline edges, in which case the driver may include means for determining when an image outline edge passes non-vertically through a cell print area. In that case, the non-vertical outline edge may be represented by generating at least two drive signal transitions for that cell print area.

In another embodiment, the raster print engine driver of the invention reproduces text or line art image from incoming data representative of the image, in which the reproduced image has an apparent vertical resolution greater than that of the print engine. In many cases, the driver includes means for establishing a cell scan time period representing an elemental cell print area of at least 0.005 inches in length, and means for driving the print engine to produce in a cell print area the amount of image darkness in the cell print area with the precision of at least five bits, and the horizontal center of gravity of the darkness with a precision of at least three bits; five bits of a byte may be used for darkness calculation and three for the center of gravity.

In still another embodiment, the driver generates, from incoming data pixels representative of a continuous tone image, a transition-modulated engine drive signal for causing the engine to reproduce the image as a series of modulated print lines forming position-modulated halftone dots, in which the driver includes means for establishing a halftone dot print area including a pair of input data pixels on each of two different input data lines, and means for generating from the four input data pixels a plurality of independently located drive signal transitions to cause the print engine to change state at selected points in the print area to produce a halftone dot from the four data pixels.

The means for generating may produce a halftone dot centered in the print area when each of the four input data pixels have the same value, or a halftone dot displaced vertically or horizontally from the center of the print area when the center of gravity of the four input data pixels is not centered in the print area. Also, the driver may produce a halftone dot distorted diagonally within the print area when the center of gravity of the top pair of input data pixels is different than that of the bottom pair of input data pixels.

In this embodiment, the means for generating may include means for creating a computed pair of data pixels for each engine scan line through the halftone dot print area. In that case, the computed pair of data pixels may be based on a weighted average of the values of both pairs of input data pixels for a halftone dot print area; the weighting may be determined by the vertical position within the print area of the engine scan line. This may be accomplished by weighting the upper pair of input pixels for scan lines above the halftone dot print area center at 100% and the lower pair of input pixels for scan lines below the halftone dot print area center line at 100%.

The means for generating may include means for altering the value of at least one of the four input data pixels to sharpen the reproduced image; preferably, the difference in value among the four input pixels in at least one of the x and y dimensions is exaggerated to sharpen the image.

In a preferred embodiment, the print engine driver generates at least zero or two independently located drive signal transitions, and possibly a third transition, from each pair of input data pixels. The drive signal transitions may be generated from a lookup table for storing data representative of the transitions. In that case, the lookup table may be addressed with at least one of the sum and difference of the value of the computed pair of data pixels. The transitions may be generated by averaging each pair of computed data pixels to determine the density of the portion of the halftone dot on the current engine scan line, in which case there may further be included means for horizontally displacing that portion of the halftone dot to reproduce the center of gravity of the computed pair of data pixels.

DISCLOSURE OF PREFERRED EMBODIMENTS

Other objects, features and advantages will occur to one skilled in the art from the following description of preferred embodiments and the accompanying drawings in which:

FIG. 13 is a representation of the digital data input for a continuous-tone image for the output of the driver of this invention;

FIGS. 14A through 14C show another digital data input for two halftone dot cells, and a resulting output for the same and a displaced center of gravity, respectively;

Figures 16A, 16B, 16C:
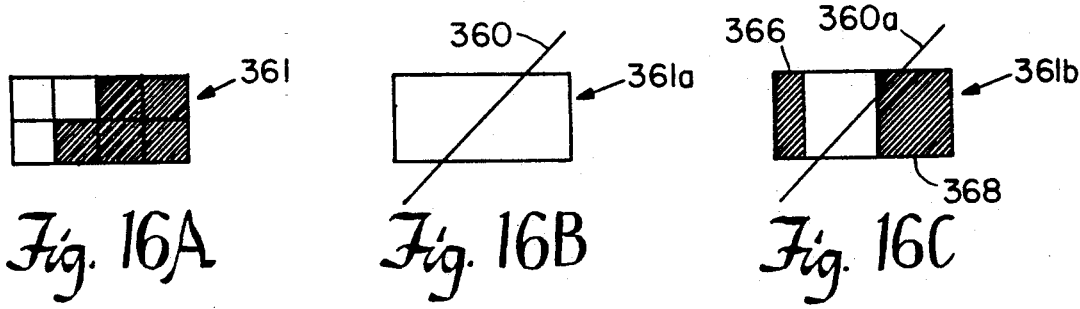
Figure 16D:
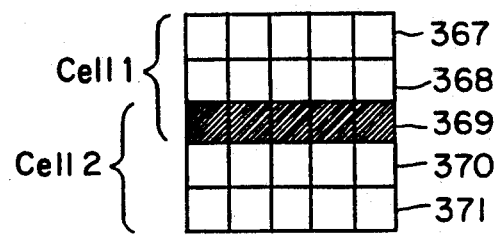
Figure 17A:
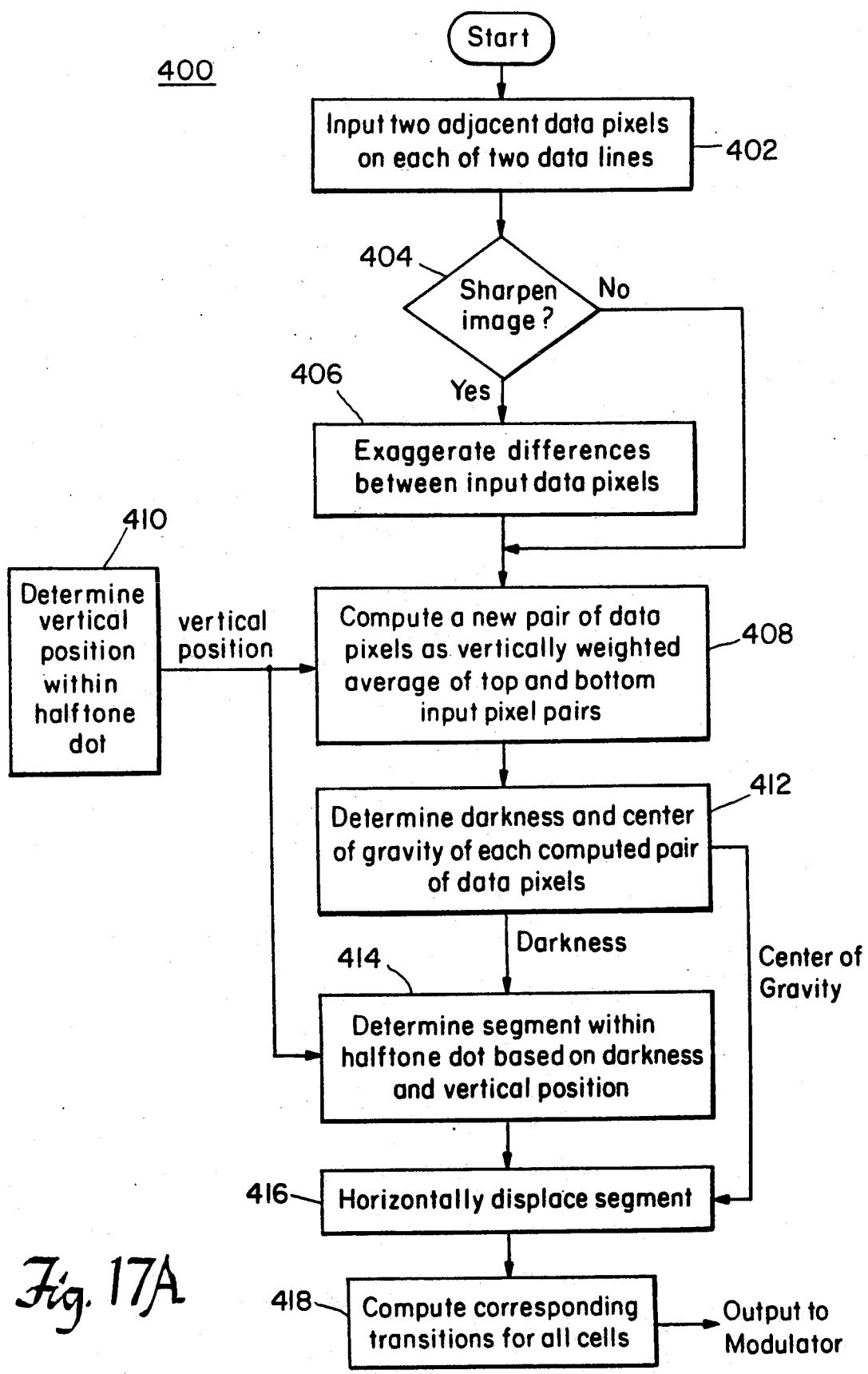
Figure 17B:
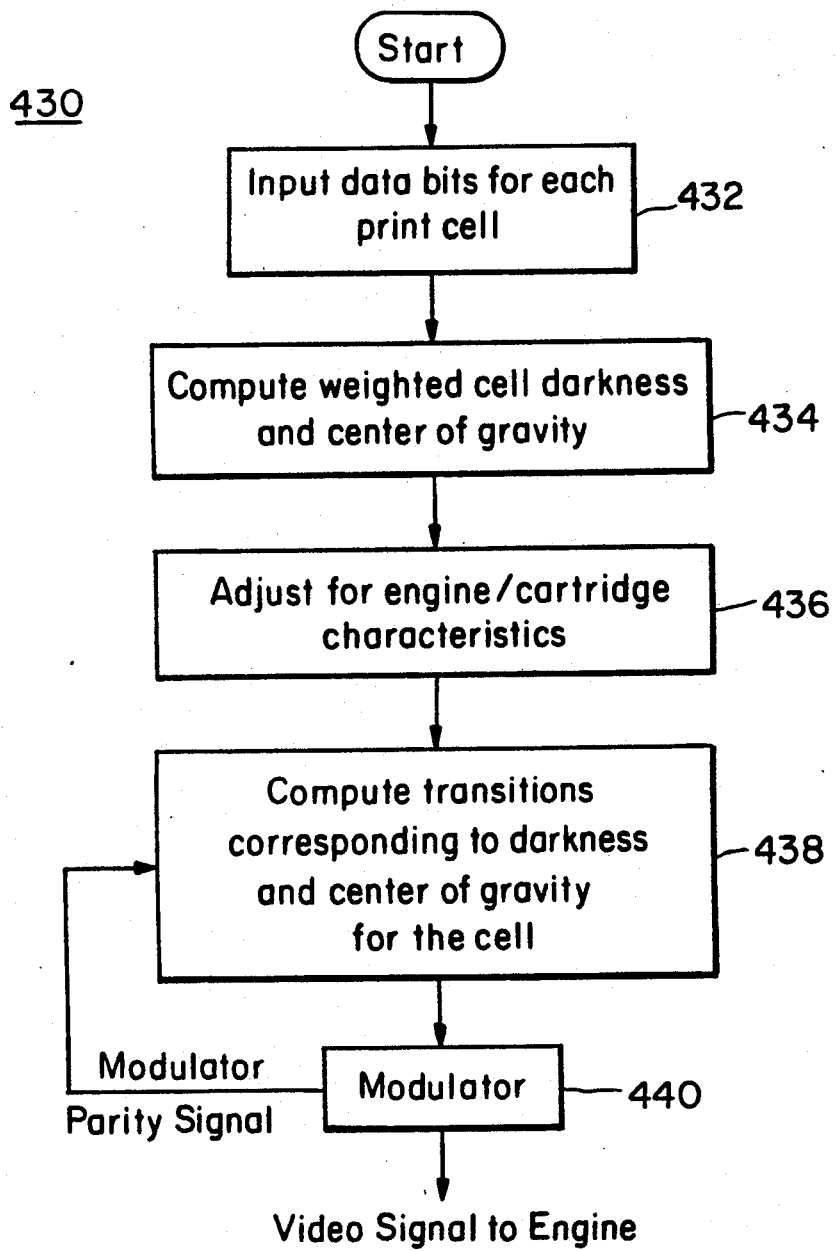

FIGS. 15A through 15C schematically illustrate a four-scan halftone dot output centered and displaced horizontally and diagonally, respectively;

FIGS. 16A, 16B and 16C are schematic representations of an input bitmap within one cell, an outline edge within a cell, and an output from that bitmap or outline edge having the same darkness and center of gravity;

FIG. 16D is a schematic representation of a bitmap for two overlapping print cells;

FIG. 17A is a flow chart for dot position modulation using the driver according to this invention; and FIG. 17B is a flow chart for text reproduction using the driver according to this invention.

This invention may be accomplished in a raster print engine driver which transition-modulates the print engine drive signal at zero or two independent locations within each elemental cell print area, and at times a third location, to provide a signal which can be used to precisely reproduce a halftone image or continuous tone image as well as text or line art.

Figure 1:
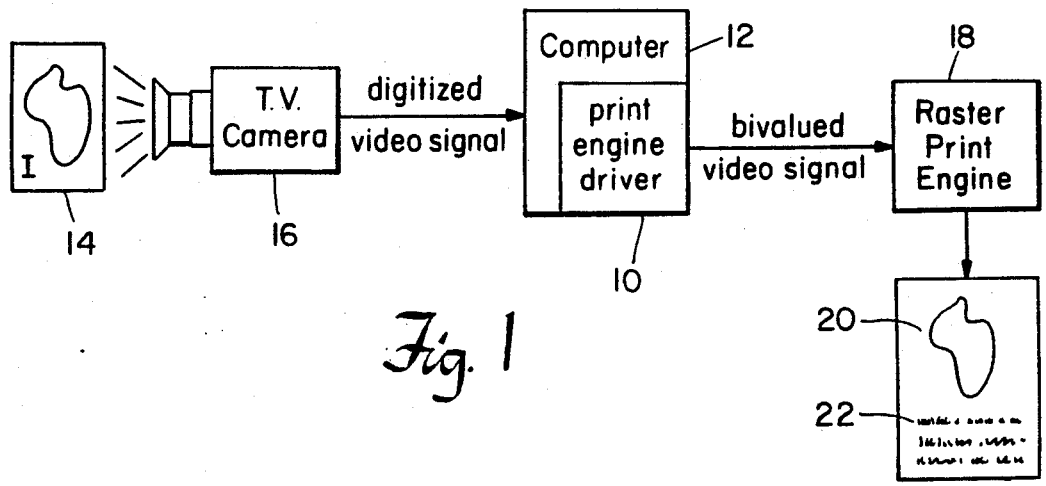
FIG. 1 is a block diagram of a typical use of the raster print engine driver according to this invention for translating a scanned image into a video signal for application to a raster print engine to reproduce a halftone or continuous-tone image.

There is shown in FIG. 1 print engine driver 10 according to this invention which typically resides on a printed circuit board connected to the bus of computer 12, which may be, for example, an IBM PC/AT. Print engine driver 10 translates the video signal from T.V. camera or scanner 16 scanning image 14 (a halftone or continuous tone image) into a video signal applied to raster print engine 18 for reproducing image 20.

Figure 2A:
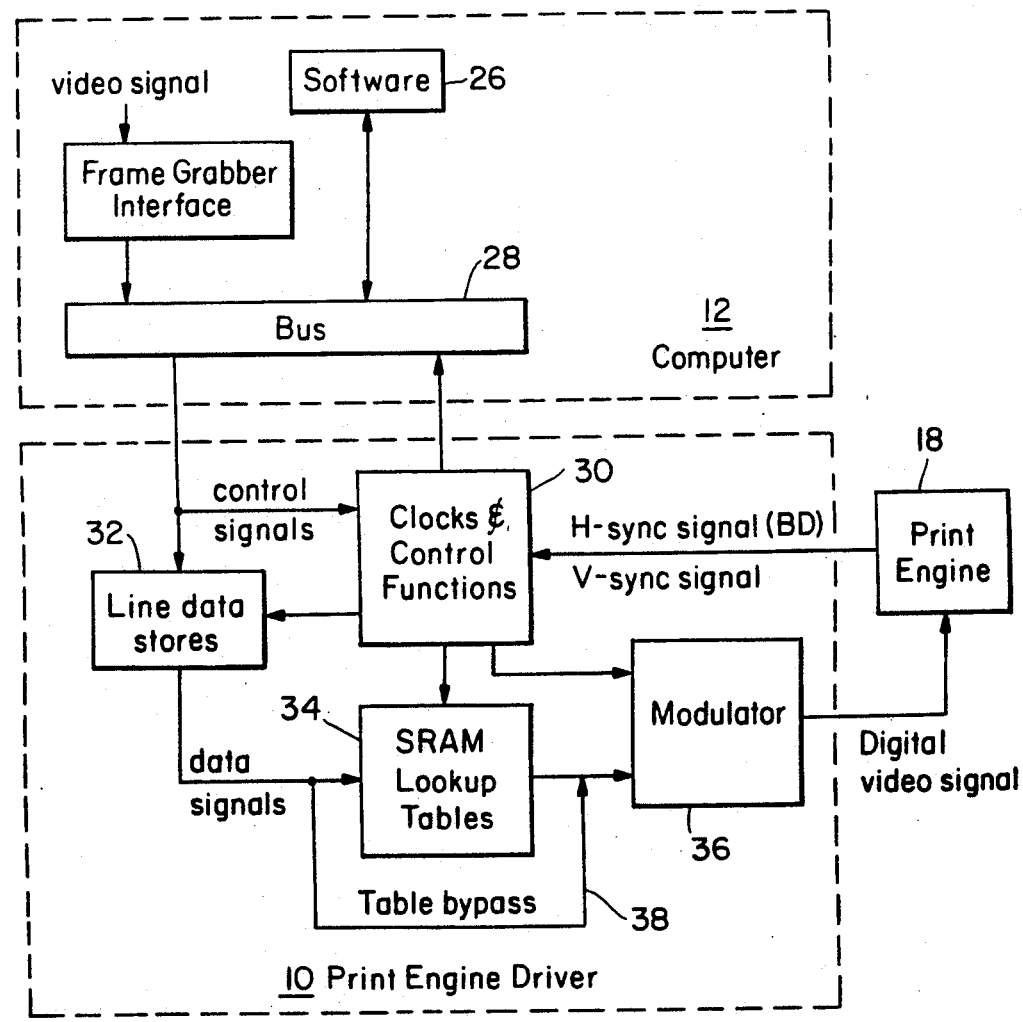
FIG. 2A is a block diagram of the raster print engine driver of FIG. 1.

An embodiment of print engine driver 10 is shown in more detail in FIG. 2A, in which it can be seen that driver 10 is connected to 16-bit bus 28 of computer 12, which is controlled by the print engine driver software 26, which also forms part of the raster print engine driver according to this invention. Software 26 resides in the host computer or a separate embedded microprocessor system. Print engine driver 10 takes in the digitized video signal from the resident frame grabber or interface; the signal may be generated either from scanning an image with, for example, a T.V. camera or scanner, or may be an image residing in the memory of computer 12 (computer-generated or any other source). The image may also be a 600×600 dpi bitmap as is known in the art.

Under control of software 26, the incoming image information is sent to line data store 32, which buffers the data signals to move groups of signals representing an entire scan line of the print engine through the remainder of the print engine driver, as explained more fully below in conjunction with FIG. 4. Software generated control signals are applied to clocks and control function circuit 30 for generating the timing and control signals for print engine driver 10, as will be more fully explained. Circuit 30 is also responsive to the horizontal and vertical synchronization signals from print engine 18 for horizontal and vertical synchronization of the printed image on the page.

The data signals are clocked from the line data store into the SRAM lookup tables (LUTs). The data signals are used as addresses for the lookup tables, which then output digital signals representing the location of transition(s) of the output video signal within an elemental print area or cell, typically 1/150″ or 1/200″ long. Those signals are applied to modulator circuit 36, which in response creates the transition modulated video signal applied to print engine 18 for control of the laser, LED, or other printing device to reproduce the input image as one or more line segment(s) and/or blanks along the scan line of precisely controlled position and length.

Figure 2B:
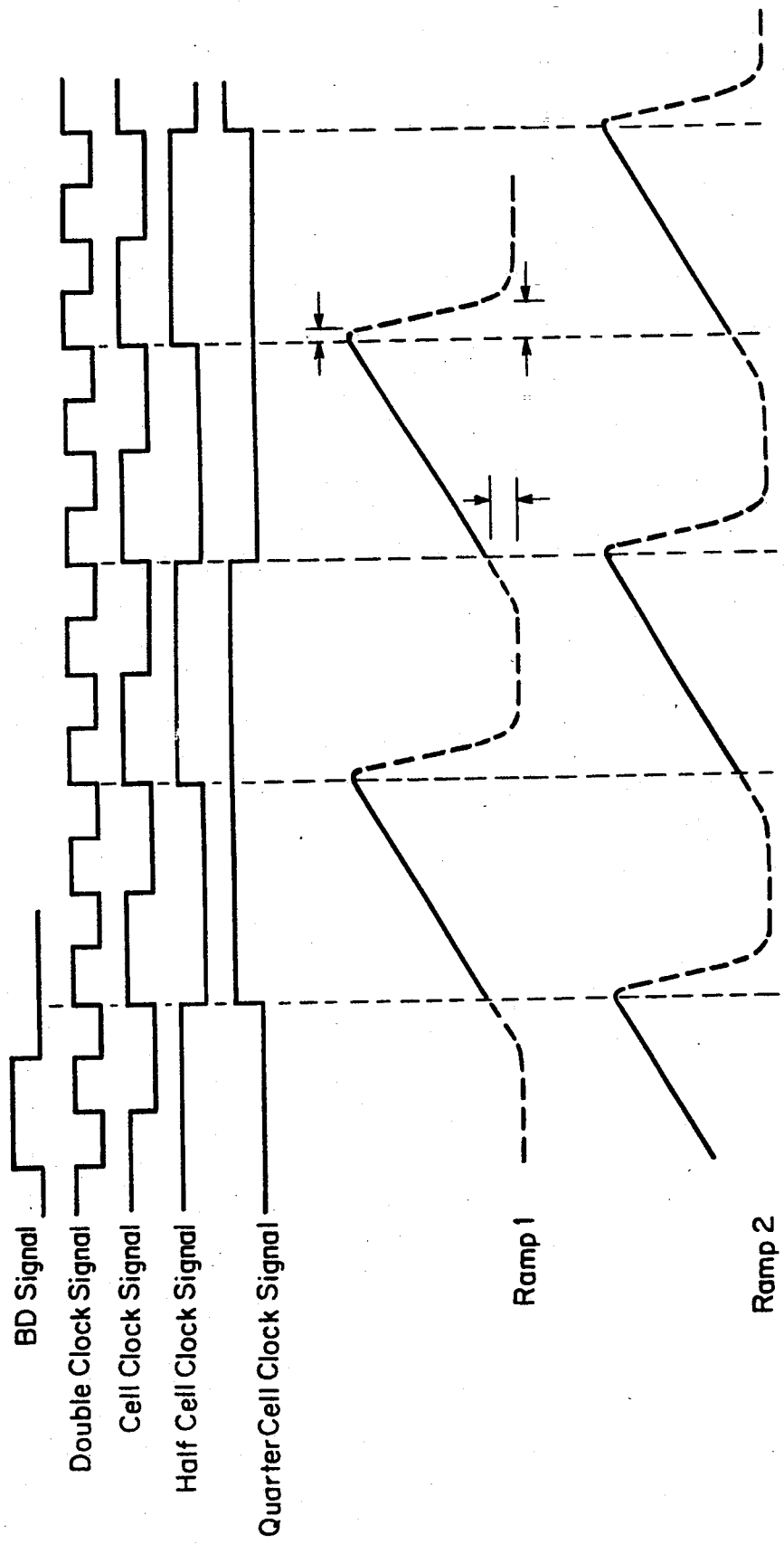
FIG. 2B is a tiiing diagram for an analog ramp signal embodiment of the print engine driver of FIG. 2A.

FIG. 2B depicts the relationship of the generated timing signals and the ramp signals generated by modulator 36 to the BD, or beam detect, signal generated by print engine 18 at the start of a line scan. Clock circuit 30, described in detail below in conjunction with FIG. 7, generates from the leading edge of the BD signal the clock signal establishing the duration of a print cell; this also establishes the cell size because of the fixed laser scan rate. As an example, when the print engine driver according to this invention is used to drive a Canon LBP-SX print engine, which typically operates at 300 lines per inch, the period of the cell clock signal, or the cell time period, is approximately 1 microsecond.

The cell clock signal is derived from the double clock signal running at twice the rate of the cell clock signal. The double clock signal is also used to generate the half-cell clock signal and quarter-cell clock signal, having, respectively, a frequency of one-half and one-quarter of the clock signal. The overlap shown in phantom in FIG. 2B at the beginning and the end of each period may be provided to enhance reliability especially for very high speed engines. As is more fully described below, modulator 36 generates ramp signals ramp 1 and ramp 2 having a maximum duration of the cell time period. Two ramp signals are used so that one ramp has enough time to settle and to reinitiate, after it is used to generate the video signal, before it needs to be used again. Thus, at least one ramp signal begins at the start of each cell clock period and has a duration no longer than the cell clock period.

A single ramp may also be used, creating a dead or inaccessible zone in each cell. The illustrated embodiment uses four ramps, duplicating each of the two alternate-cell ramps twice, one for each D/A converter, and has no dead zones.

Figure 3A:
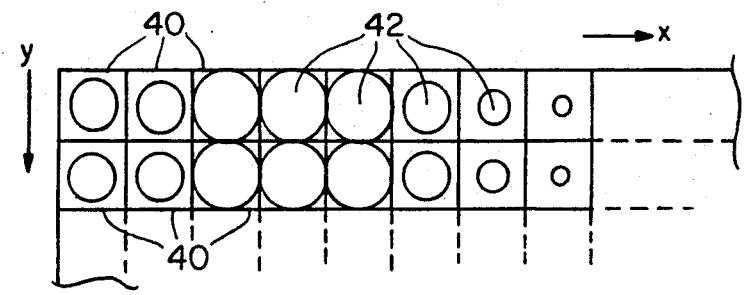
FIGS. 3A and 3B are schematic diagrams of a halftone dot output accomplished by the print engine driver according to this invention, showing the elemental cell print areas employed in the invention.
Figure 3B:
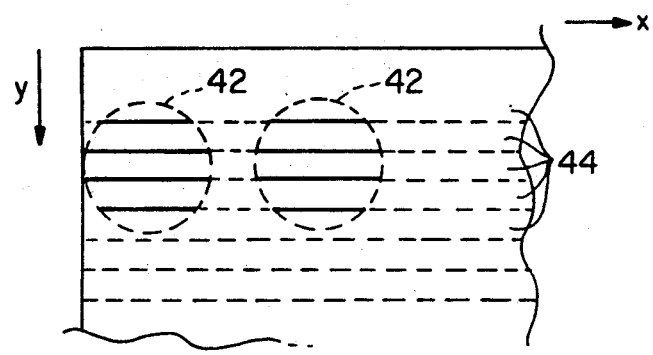

Raster print engine driver 10 may be used to reproduce halftone images by causing print engine 18 to print halftone dots, schematically depicted in FIGS. 3A and 3B. Cell areas 40, FIG. 3A, have a width in the horizontal direction X which is defined by the period of the cell clock signal; that length is typically 1/200 or 1/150 inch. The length of each cell 40 in the vertical direction y is a function of the print engine used; the length is a minimum of one horizontal scan line width, and can be chosen to be up to a maximum of four scan line widths in the current embodiment. In other words, halftone dots 42 may be made up of from one to four laser scans each. In the embodiment of FIGS. 3A and 3B, square cells 40 with halftone dots 42 centered therein are depicted. Other cell sizes, and relationships of the halftone dots to the cell areas, may alternatively be accomplished as is more fully described below.

FIG. 3B depicts schematically two adjacent halftone dots 42 each made of four line segments accomplished in four separate horizontal scans 44. The solid lines indicate schematically the printed line segments making up the dot. However, it should be understood that the lines actually have a width in the y direction defined by the print engine; they typically overlap to provide a more solid black image than that shown. Halftone dots 42 are thus generated as a series of line segments placed where desired within the cell areas 40.

Figure 4:
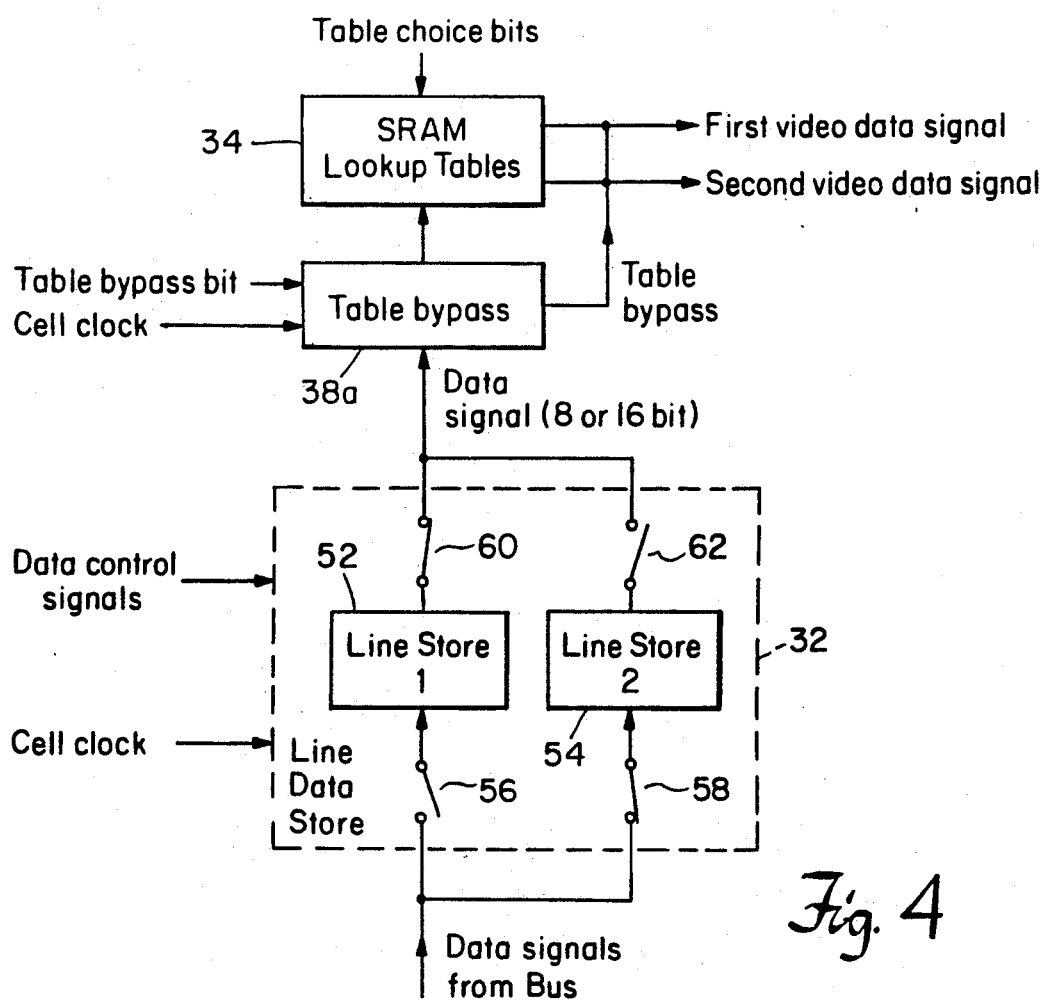
FIG. 4 is a more detailed block diagram of the line data store and lookup tables of FIG. 2A.

The digital signals representing an image are moved from the bus to the lookup tables as groups of signals representing an entire horizontal line scan using line data store circuit 32, FIG. 4. The data signals, are typically eight or sixteen bit signals, each representing one cell. Eight bit pixels are typically taken as two per each of the sixteen bit bus cycle on bus 28 according to bus timing signals. Sixteen bit pixels applied to the lookup tables typically have the low byte used to represent the gray level (in other words used as a lookup table address), with the high byte or part of it used to select the table, to provide the ability to change tables on each pixel. Alternatively, the sixteen bit pixels can bypass lookup tables 34, as explained below, in which case the first and last bytes are used directly as the first and second video data signals, respectively.

Line data store circuit 32 has sufficient memory to store two full lines of 16-bit data signals from the bus. Line data store 32 is responsive to the cell clock signal as well as the software generated data control signals to control switches 56, 58, 60 and 62 in order to clock one line of data from one line store to the lookup tables while the next line of data is moved from the bus and stored in the second line store. In the example shown, the data in line store 1 is being clocked to lookup tables 34 through closed switch 60, while the data representing the next line is routed to line store 2 by closed switch 58.

In most instances, the bus data signals are applied to lookup tables 34, which in response put out first and second digital video data signals representative of the first and second signal transitions within a single cell of the video signal applied to the print engine. The lookup tables are typically downloaded from the computer when the printer and driver are powered up. Lookup tables 34 are configured as is known to those skilled in the art so that the incoming data signals are used to address the memory locations, which in response generate two eight-bit video data signals provided to the modulator circuit as is explained below in conjunction with FIG. 5. When eight-bit pixels are employed, the table currently in use is prechosen by the table choice bits under software control. When sixteen-bit pixels are employed, the high byte is interpreted as the table selection, and the low byte as the gray level; both together constitute the memory address. The address bits and the lookup table(s) are entirely under software control and may be assigned other interpretations than these.

Figure 5:
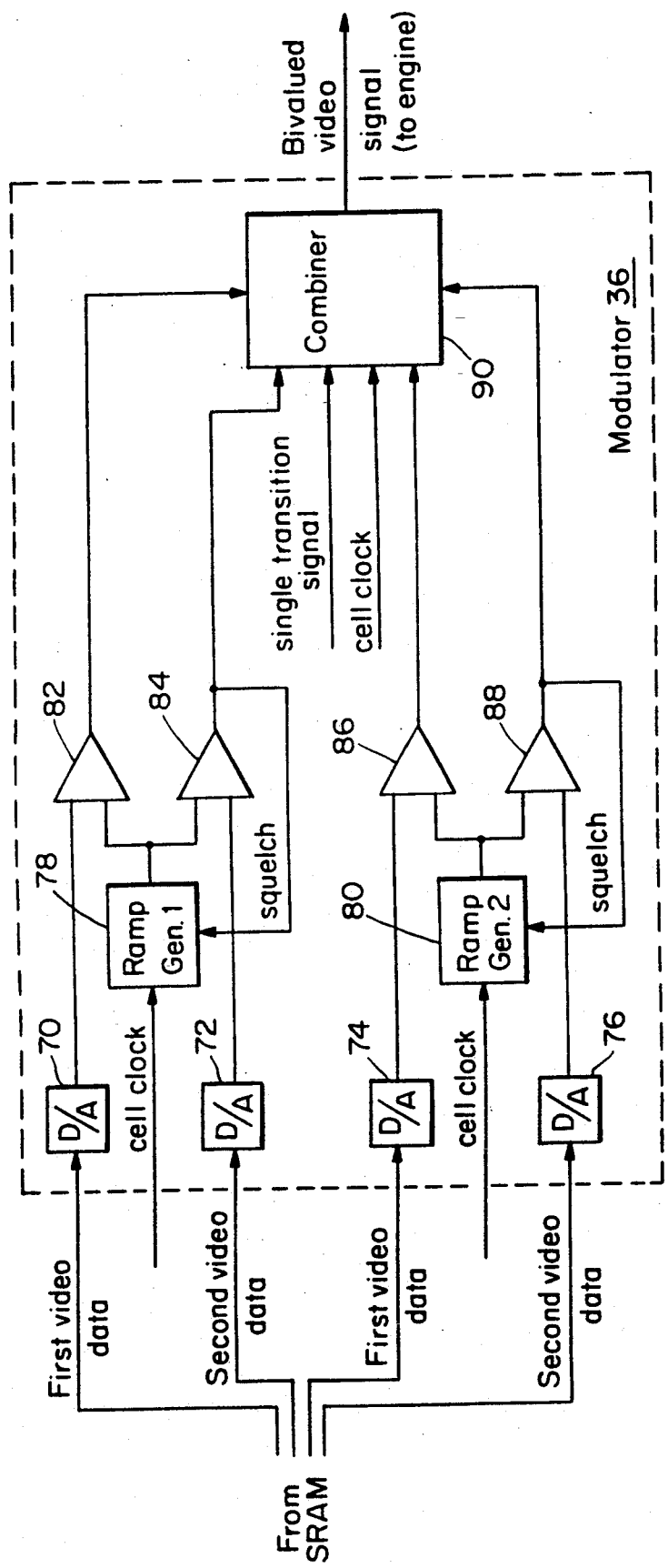
FIG. 5 is a more detailed block diagram of the modulator of FIG. 2A.

Analog modulator 36, FIG. 5, incldes first set of D/A converters 70 and 72, and identical set 74 and 76, which alternately generate the video signal for each cell. The first and second video data signals from the lookup tables are applied to one set of D/A converters, for example, converters 70 and 72, which in turn each put out an analog signal having a discrete value. Since the video dat signals from the LUTs are eight bit signals, the analog signals each have one of 256 possible values. The lookup tables are normally configured so that the analog signal from converter 70 or 74 representing the first video signal is never higher than the analog signal from converter 72 or 76, respectively, representing the second video signal, although the signals may have the same value.

Analog ramp generator 78 under control of the cell clock signal generates one of the ramp signals shown in FIG. 2B. The ramp signal is applied to comparators 82 and 84, which in response generate signals when the input analog data signal is crossed by the ramp signal. Thus, the signals from comparators 82 and 84 have transitions at the two places at which the analog video signals meet the ramp signal. The second transition, resulting from the second video data signal, is employed to squelch the ramp signal from generator 78. Combiner 90 takes in the pulses from comparators 82 and 84, and in response produces a transition modulated video signal which is applied directly to the print engine to control the on-off cycles of the laser to cause the engine to change state zero, one or two times per cell, as uniquely determined according to the values of the first and second video data signals.

On the next occurring cell clock signal, ramp generator 80, D/A converters 74 and 76, and comparators 86 and 88 are employed to accomplish the same function as the parallel set of circuitry described above. Thus, each set of the two sets of parallel circuitry are used for alternate cells. This arrangement allows the ramp signal to have a period which may be as long as the cell time period in order to allow the two video signal transitions to be placed anywhere within the cell. When a single transition within a cell is desired, the first transition byte is set as all ones, representing the end of the cell interval, where the first transition normally would not occur. Combiner 90 takes this signal in directly, and in response causes the only transition within the cell to occur as a result of the second transition byte.

Figure 6:
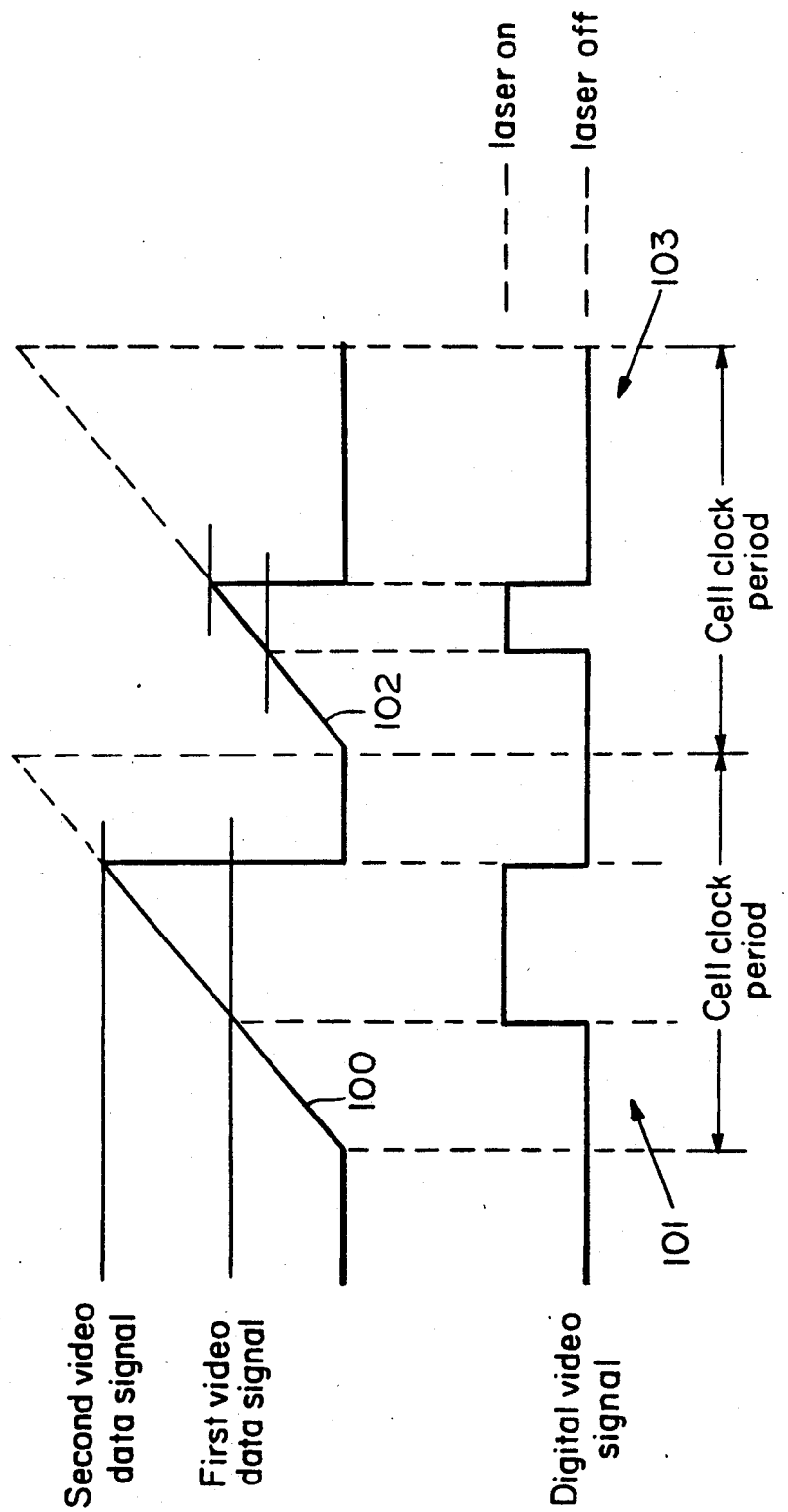
FIG. 6 depicts the signals employed by the modulator of FIG. 5, and the transition modulated video signal created therefrom for application to a raster print engine.

An example of the modulated video signal put out by modulator 36 is shown in FIG. 6, which depicts the generation of a video signal for two adjacent cells. The signal within first cell 101 is accomplished by comparing ramp signal 100 from ramp generator 78 to the first and second analog video data signals. When the first video data signal meets ramp 100, the output video signal reverses polarity. Typically, the line scan starts with the video signal low, representing "laser off", and the first transition takes the video signal high, which turns the laser on. Subsequent transitions cause the output video signal to repeatedly change state and to turn the laser on and off. The second video data signal-ramp crossing within each cell also is employed to squelch ramp 100 as shown. Ramp signal 102 from ramp generator 80, FIG. 5, is employed for alternate cells to generate the transition modulated video signal as shown.

As can be understood by the combinations of FIGS. 5 and 6, the first and second video data signals may determine the location of two transitions. It should be understood that if the signal is high to start with, the transitions will create an "off" period defined by the incoming data signals. This results in the two transitions determining the end of one printed line segment and the beginning of another within a single cell. To accomplish no transition within a cell, first and second video data signals having the same value are employed, causing both transitions to occur at the same time. The single transition case, which changes the state of the signal in all subsequent cells in the scan line, produces a single change in state in the video signal as described above. The result of this arrangement is that either zero, one, or two output video signal transitions may be provided within each cell.

Since the analog video data signals are generated from eight bit video data signals, the analog signals have one of 256 values. This provides the ability to place the transitions at any of 256 different locations within each cell. The result is that, for example, with a cell clock creating 150 cells per inch, there are 150 times 256, or 38,400 possible transition locations per inch; 38,400 on-off dots-per-inch would be required to achieve this performance in a bit-map architecture The clock period may arbitrarily be chosen and be above or below the LPI of the engine.

Figure 7:
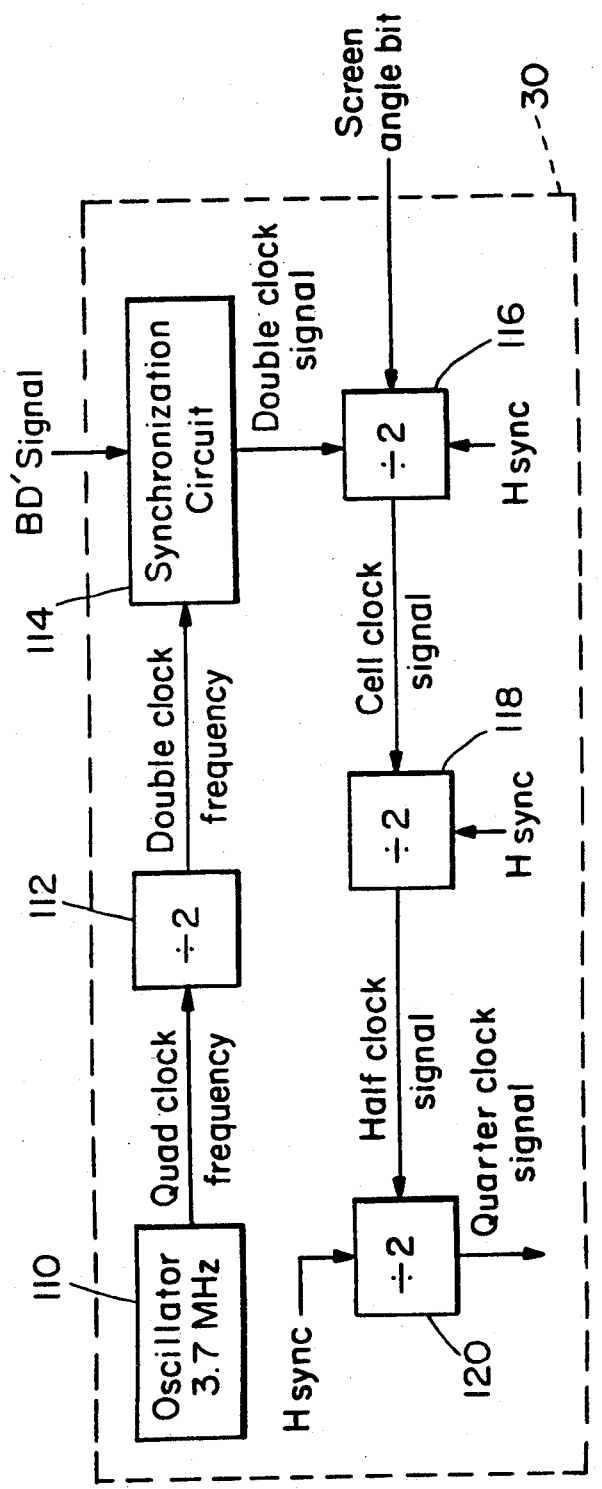
FIG. 7 is a more detailed block diagram of the clock circuit of FIG. 2A.

The portion of clock and control function circuit 30 which provides the clock timing signals shown in FIG. 2B is schematically shown in FIG. 7. Crystal oscillator 110 operating at 3.7 megahertz is employed for generating a signal at that quad clock frequency; this creates a 1/150 inch cell on a Canon SX engine. Frequency divider circuit 112 puts out the double clock frequency signal shown in FIG. 2B, which runs at twice the speed of the cell clock signal, generated from circuit 116. Synchronization circuit 114, shown in more detail in FIG. 8, has as its input the double clock signal and the BD' signal, the same as the BD signal except when the horizontal sync is software generated, in which case BD is ignored. Synchronization circuit 114 puts out the double clock signal depicted in FIG. 2B which has the same frequency as the double clock input but is carefully synchronized with the beginning of the laser scan to prevent horizontal misalignment of the different vertically displaced segments of the halftone dots, which would result from horizontal jitter in the output. Frequency divider circuit 116 in response to the double clock signal and the software generated screen angle signal puts out the cell clock signal which clocks the various operations throughout the circuit, including generating the output video signal; the cell clock signal thus determines the cell lengths, and cell positions in the scan line. Circuit 118 again divides the cell clock signal to generate a half clock signal, which is divided again by circuit 120 to generate the quarter clock signal. The output of circuit 30 is the cell clock, half clock and quarter clock signals shown in FIG. 2B.

Figure 8:
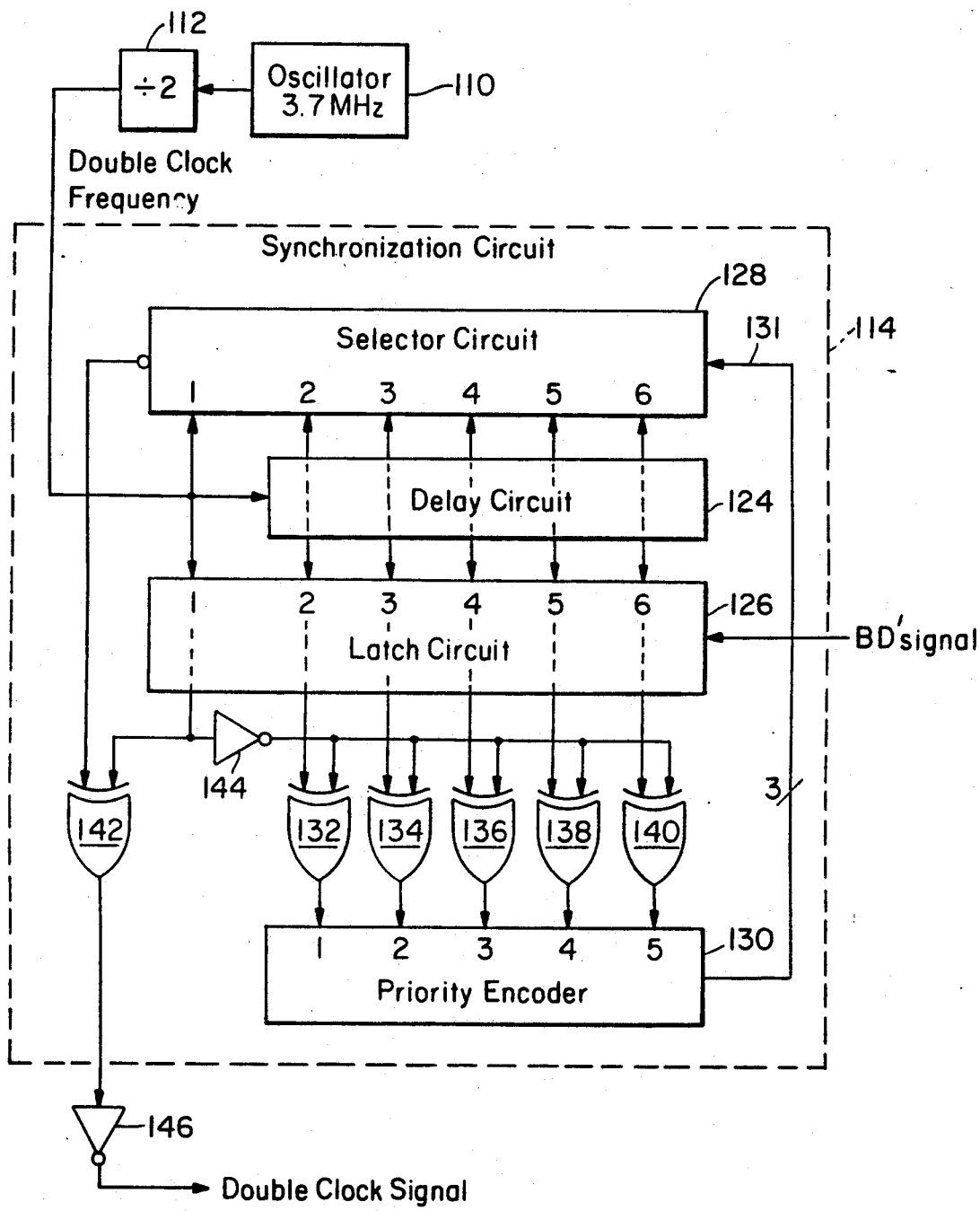
FIG. 8 is a more detailed schematic diagram of the horizontal synchronization circuit of the clock circuit of FIG. 7.

Synchronization circuit 114 is shown in more detail in FIG. 8, in which it can be seen that the fixed clock signal, having a frequency of the double clock signal, and a random phase vis-a-vis the BD signal, is provided as an input to delay line 124, which in turn has five outputs labelled two through six, which along with its input labelled one, are provided both to selector circuit 128 and latch circuit 126. The input and five outputs of delay circuit 124 are, from output one to output six, square wave signals each delayed one-twelfth (one-sixth of one-half) of the period of the double clock frequency signal more than the previous. In other words, delay circuit 124 effectively divides the double clock frequency square wave signal into six equally spaced signals. Latch circuit 126 has as its input these six signals as well as the BD' horizontal sync signal, which is normally identical to print engine BD signal identifying the beginning of a laser scan. The BD' signal leading edge freezes the latch inputs one through six at the time of the BD' signal. As a result, the latch circuit output holds the values of inputs one through six at the time of the BD' signal for the entire scan line, until receipt of the next BD' signal at the start of the next scan line. Thus, the evenly divided six-part double clock frequency signal is effectively frozen at the start of the beam line scan.

Output one from the latch circuit, representing the value of the double clock frequency signal at the time of the BD' signal, is passed to gate 142 and also to inverter 144 for application to gates 132, 134, 136, 138 and 140, which are also supplied with the signals from latch circuit outputs 2 through 6, respectively. The output of gates 132, 134, 136, 138 and 140 are applied as inputs 1 thorough 5 respectively of priority encoder 130. A priority encoder determines where the first significant (non-zero) digit of an incoming binary number is, and puts out a binary number representing that position. For example, if latch circuit 126 output from pins one through six respectively is 000111, the input to priority encoder 130 at inputs 1 through 5, respectively, is 11000, and priority encoder 130 supplies a signal on line 131 to selector circuit 128 which represents the first zero input, position three. Selector circuit 128 in response takes the input at the enumerated position 3 for its output, applied to exclusive or gate 142, the output of which is applied to inverter 146. This arrangement results in the production of a square wave signal at the double clock frequency which is synchronized with the BD' signal to within one-twelfth of the double clock period, or one twenty-fourth of the cell clock period. The result is that the cell clock signal is synchronized to the BD' signal with an error of approximately plus or minus two percent of the cell clock signal period, which results in a maximum potential line to line horizontal misalignment of plus or minus two percent of one cell, typically 1/7500 inch. This synchronization control is accomplished without an extremely fast oscillator, which allows the synchronization circuitry to run at speeds comparable to the rest of the circuit, greatly increasing horizontal control without operating at prohibitive frequencies.

Figure 9A:
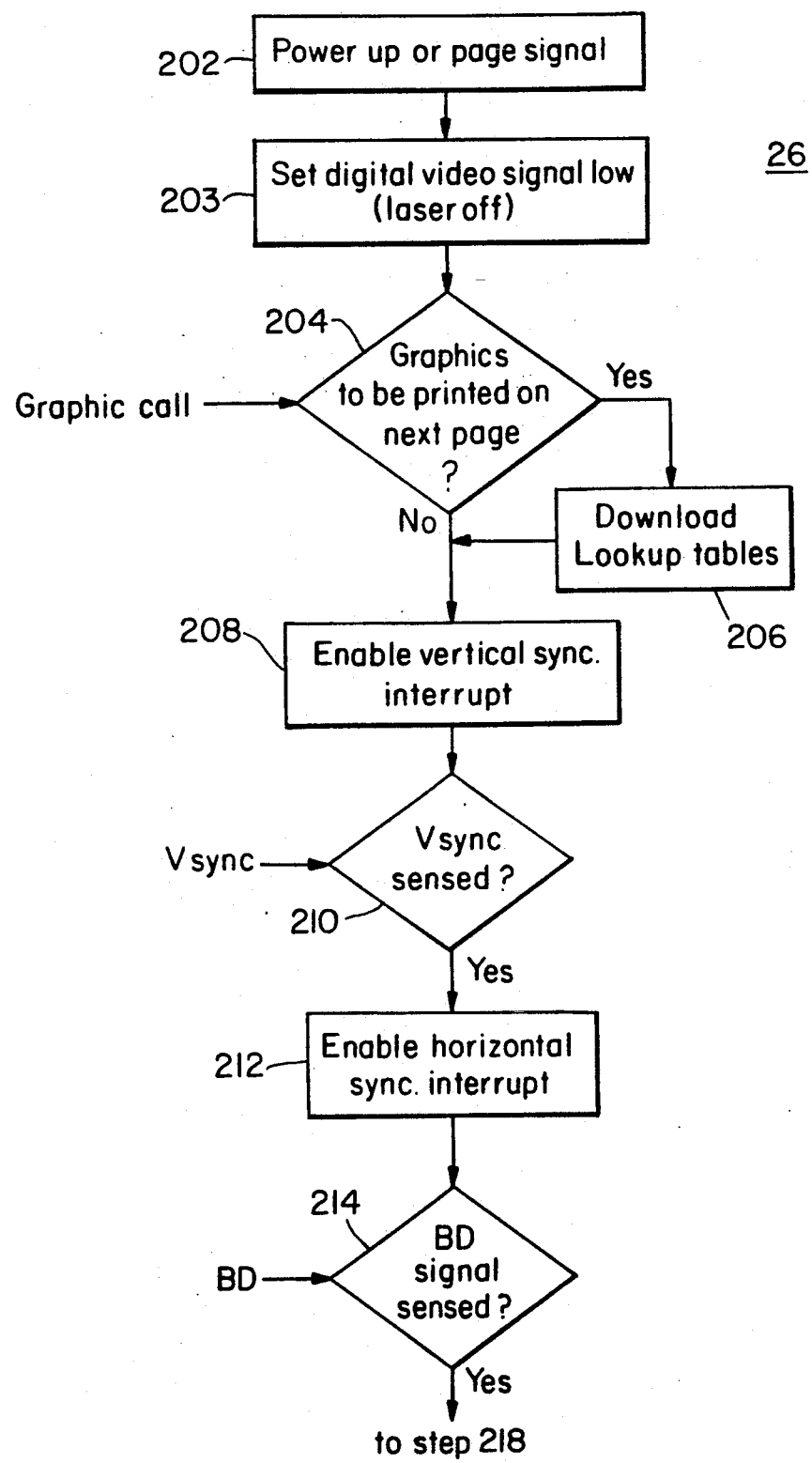
FIGS. 9A, 9B and 9C are block diagrams of the driving software for the raster print engine driver of FIG. 2A.
Figure 9B:
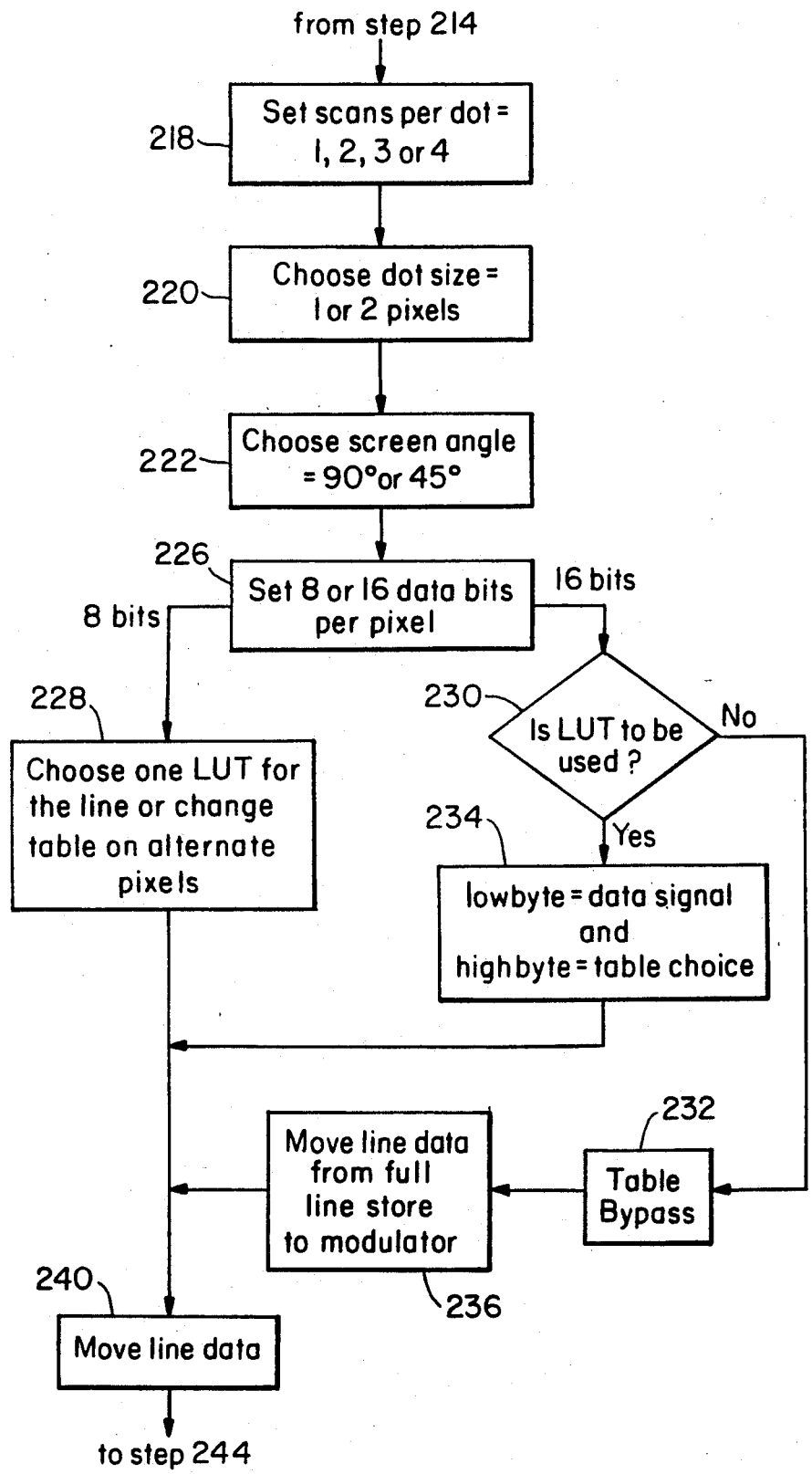
Figure 9C:
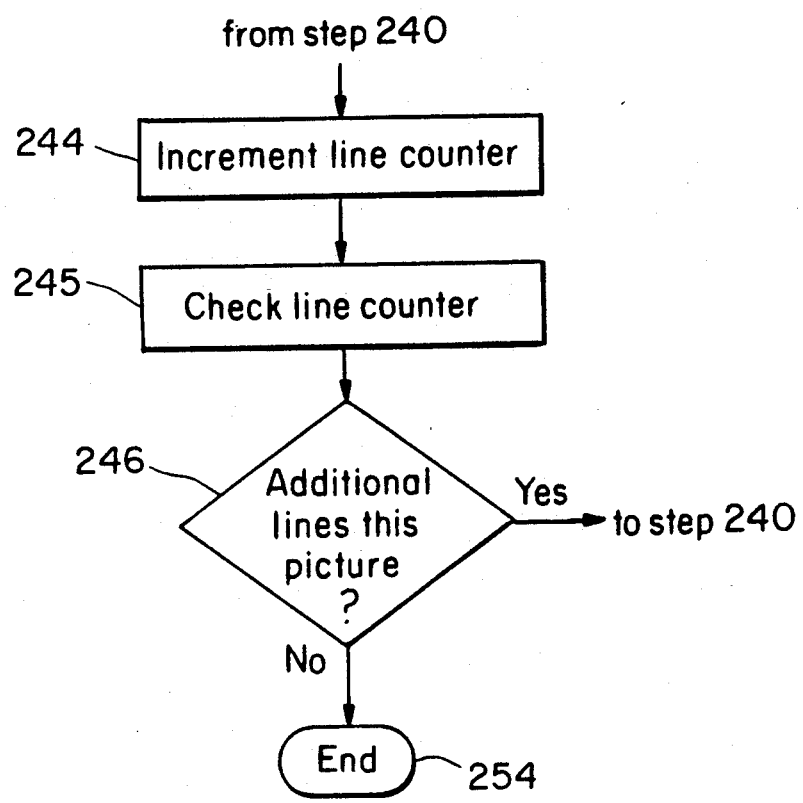

Software 26 for controlling the operation of the driver circuitry is shown in FIGS. 9A through 9C. Flow chart 26 begins at step 202, which enables the software at power up or when the last page printing is complete. When an image is to be reproduced on the next page, step 204, the lookup tables are downloaded from the computer memory, step 206. The vertical sync interrupt is enabled, step 208, to provide a page-print starting point of the beginning of the paper feed into the printer. From that point, each horizontal line is counted by keeping track of the beam interrupts from the print engine, and the position of the data lines on the page is determined in accordance with the number of lines sensed. The vertical sync is sensed in step 210. At step 212, the horizontal sync interrupt is enabled for sensing the BD signal from the print engine in step 214. In steps 218, 220, 222, and 226 a number of software controlled options are chosen.

In step 218, the number of horizontal scans making up each output halftone dot is chosen. In step 220, the dot size is chosen as either one or two cells; this provides the ability to make dots having a width of either one or two cells, with a length of from one to four horizontal scans. At step 222, a screen angle of 90° or 45° is chosen. The 90° screen angle provides the output as shown in the example of FIG. 3A, in which the cells are vertically aligned. The 45° screen shifts every other line to the right a distance equal to one-half of a cells length using a screen angle signal provided to divider circuit 115, FIG. 7, which in turn delays its cell clock signal output by one-half period for every other line. In step 226, the cell word size is chosen as either 8 or 16 bits. From this point, operation proceeds separately for a number of steps depending on the chosen cell word size.

If the cell word is eight bits long, at step 228 either there is one look-up table chosen for the entire line, or the tables are switched between two tables on alternate cells for the entire line, accomplished with a table choice signal applied to tables 34, FIG. 4. Operation would then proceed to step 240.

For 16 bit data words, the next program step is a decision as to whether or not the lookup table is to be used, step 230. If the tables are not being used, the table is bypassed, step 232, for routing the data words directly to the first and second video data signal lines as shown in FIG. 4. In that case, the line data is clocked directly to th modulator circuit rather than the lookup tables, step 236. If the lookup tables are to be used, at step 234 the low byte is chosen as the data signal (table address signal), and the high byte is chosen as a table choice bit. Operation proceeds to step 240, in which the line data is moved from the full line store circuit, FIG. 4, to the lookup tables, and the next line data is provided to the empty line store.

The line counter is incremented, step 244, and the line counter is checked, step 245. If there are additional lines in the image being generated, operation loops back to step 240. If there are no more lines, operation ends, step 254.

Figure 10:
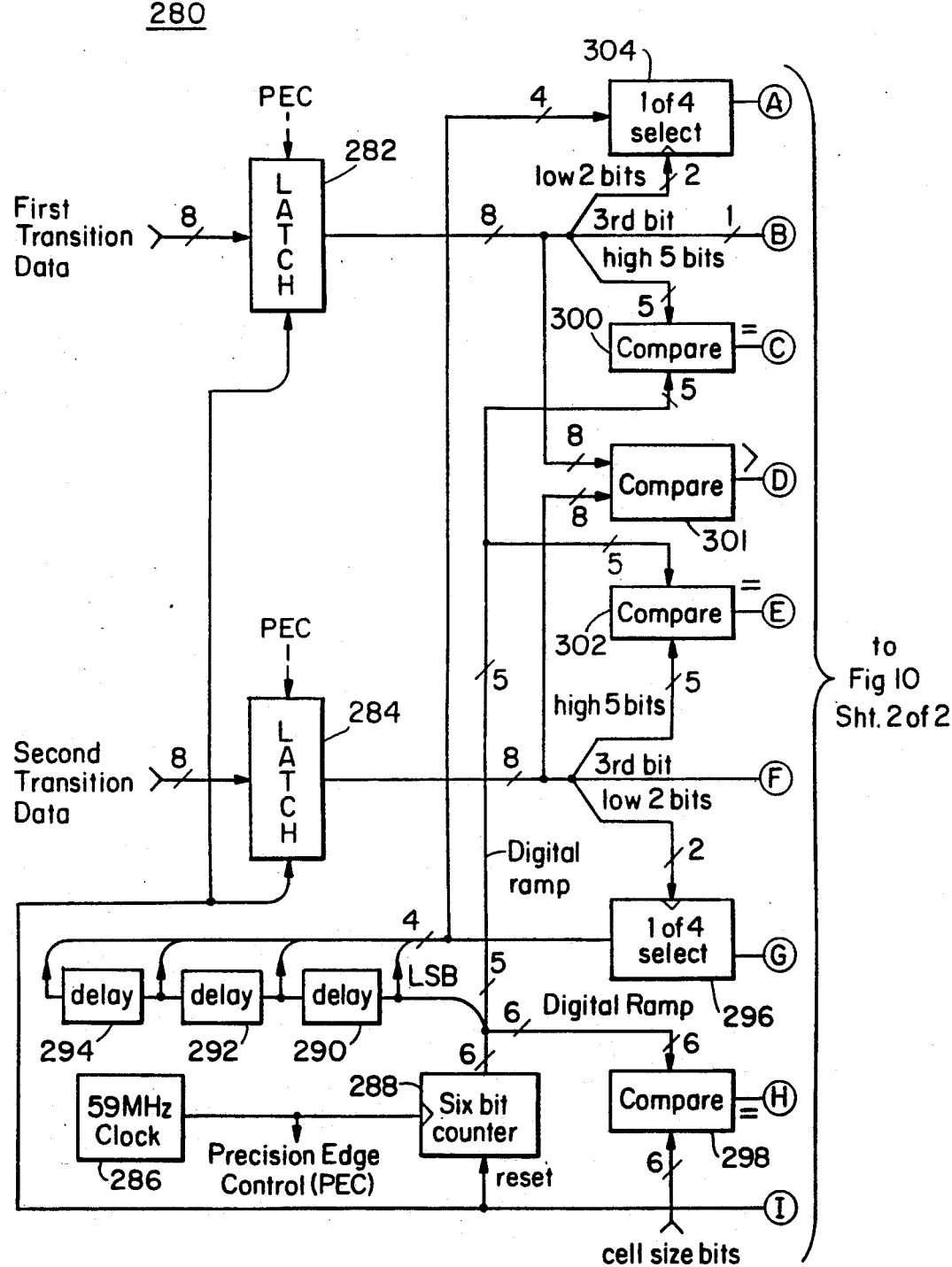
FIG. 10 is an all-digital video signal modulator circuit that replaces, in one embodiment of the invention, the modulator of FIG. 5, all of the clocks and controls circuit of FIG. 7 except for the quarter clock signal generator, and all of the synchronization circuitry of FIG. 8.
Figure 10:
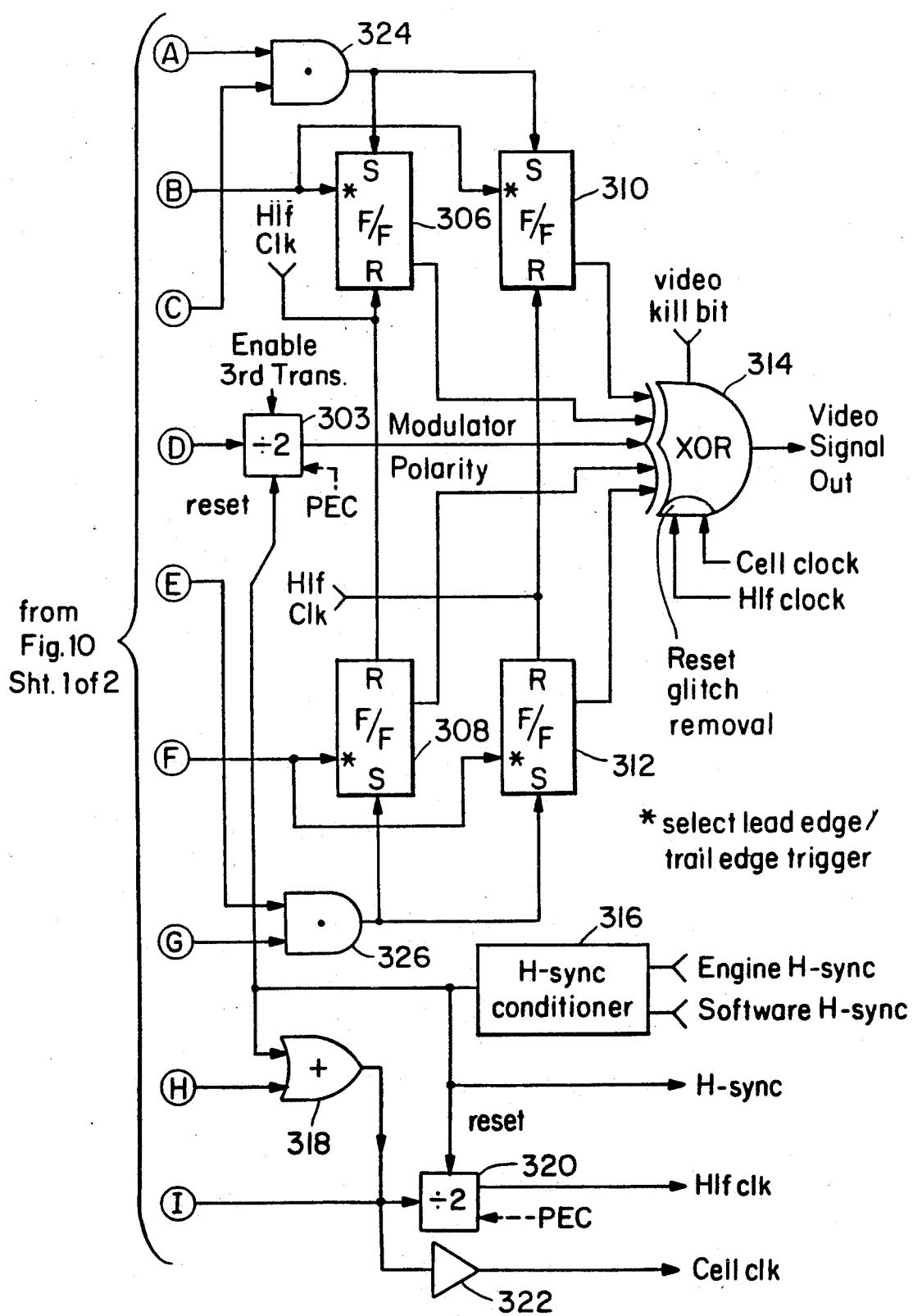
Figure 11:
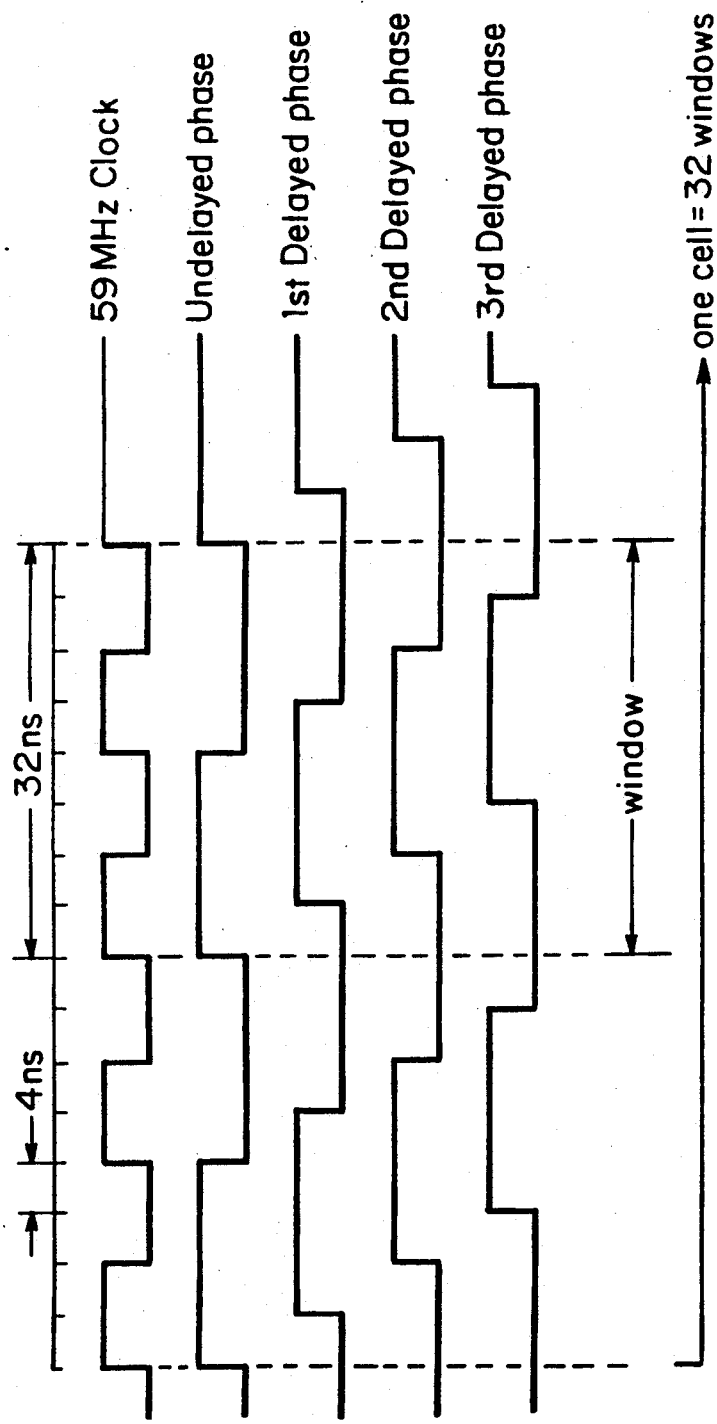
FIG. 11 is a timing diagram showing the clock and clock delayed phase signals of the modulator circuit of FIG. 10.

The modulator of FIG. 5, much of the clocks and control functions of FIG. 7, and the horizontal synch scheme of FIG. 8 may be replaced in a digital circuit embodiment of the present invention by modulator circuit 280, FIG. 10. The input to modulator 280 is the two transition data bytes labelled as first and second transition data, each consisting of eight bits. Fifty-nine megahertz clock 286 puts out the modulator clocking signal which is applied to six-bit counter 288 for providing a digital ramp signal as well as providing a precision edge control (PEC) signal to various other components as shown. Counter 288 provides a six-bit digital signal incremented each clock period to accomplish a digital "ramp" signal having 64 values. The high five bits of the transition data byte currently in process is compared to the five most significant bits of the digital ramp in comparator circuits 300 and 302 to choose one of 32 possible transition locations or windows for each of the first and second data bytes. In a preferred embodiment, the elemental cell print area is 1/150 of an inch long, corresponding to about one microsecond; the area may be 1/200 inches long. As shown in FIG. 11, each 1/150 inch cell is then comprised of 32, 32 nanosecond-long windows each including two cycles of the 59 megahertz clock.

Each window is effectively divided into eight, four nanosecond sections by delay circuits 290, 292, and 294 in conjunction with one of four select circuits 304 and 296 a follows. The least significant bit from counter 288 is applied to the series-connected delay circuits, each of which delays the square wave signal by four nanoseconds as shown in FIG. 11. The original and delayed signals are applied to one of four select 296 along with the low two bits of the transition data signal for selecting one of the four delayed signals. The output of the select is applied to AND gate 326 along with the output from comparator circuit 302, which effectively selected one of 32 possible windows for the byte. The output of gate 326 is applied to flip-flop 308 or 312, which is enabled by the third bit of the data byte to select either the lead or trail edge of the chosen delayed signal for video signal transition placement. The result of this arrangement is that the 150th of an inch long cell is effectively divided into 256 potential transition locations. Flip-flops 310 and 312 are enabled on alternate cells by the half clock signal to allow the flip-flops time to settle.

The transition signals are synchronized to the horizontal raster scan by applying the engine or software horizontal sync signal after conditioning in circuit 316 to OR gate 318 whose output is used to reset counter 288 and latch data through latches 282 and 284 so that a new counter (and so a new cell) begins at the beginning of each horizontal scan.

Modulator circuit 280 also provides for variation of the scan time for an elemental print cell, which accomplishes print cells of variable length, preferably under software control. This is accomplished by providing the software-generated cell size bits (6 bits) to compare circuit 298, which has an output when the cell size bits equal the digital ramp signal to provide a signal to OR gate 318, whose output is used to reset counter 288 and also latch the incoming data. Accordingly, when the cell size bits equal the digital counter signal (in effect when the digital "ramp" reaches a desired value), the ramp is squelched to end one cell, and a new ramp is started to start a new cell. If the second transition value is greater than the ramp value when it is squelched, the system places the second transition at the end of the cell under control of the half-clock signal which defines the cell boundaries.

Modulator 280 provides the ability to place a third video signal transition using flip-flop 303 and compare circuit 301. When the first and second transition data bytes are in reverse order, where the first byte has a higher value than the second byte, compare circuit 301 enables divide by two flip-flop 303 under control of an enable third transition software bit to provide a transition at the beginning of the cell. The second and third transitions would then be created as before using the first and second transition data signals to accomplish three transitions in a cell, the first of which is at the cell edge. Zero transitions in the cell are accomplished by having two transitions occur at the same time. One transition is accomplished when the second transition data signal is set at zero so that the second transition overlaps the first transition at the beginning of the cell created by flip-flop 303. In that case, there is effectively no transition at the beginning of the cell, and the single transition is accomplished with the first transition data byte.

Figure 12A:
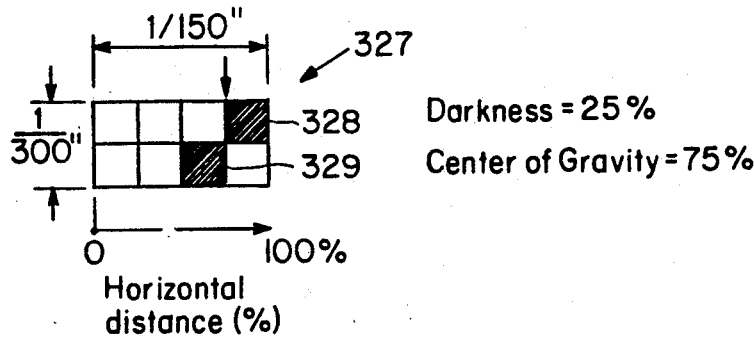
FIG. 12A is a schematic representation of an input 600×600 dpi bitmap.

FIG. 12A depicts a representation of a 600×600 dpi bit map, commonly employed as an input to the driver of this invention, within the elemental cell area 327 of the raster print engine driver, which is preferably 1/150 of an inch long in the direction of the scan and thereby encompasses four input bits, and 1/300 of an inch in the y direction and therefore encompasses two bitmap lines. Accordingly, each elemental print area, in which from zero to three transitions may be placed, reproduces eight bits. In the example shown, bits 328 and 329 are dark and the rest are white. The bits representing the elemental print cell area have a darkness of 25% (2/8ths of the bits are dark) and a darkness center of gravity of 75%. In other words, the center of gravity of the cell is 75% of the distance from the left side of the cell, or the cell origin.

Figure 12B:
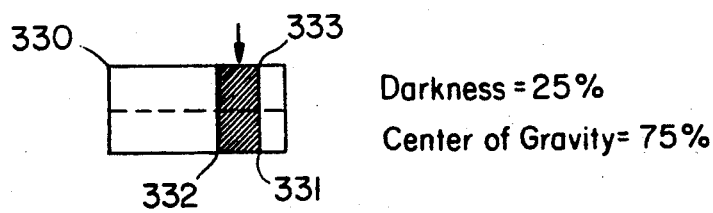
FIG. 12B is a schematic representation of an output using the driver of this invention illustrating the representation of the bitmap darkness and darkness center of gravity.

FIG. 12B depicts schematically the print engine output as accomplished by the driver of this invention for cell 327, FIG. 12A, for a case in which the driver causes the print engine to reproduce as closely as possible the darkness and darkness center of gravity of the bits in the print area; darkened area 331 comprises 25% of print cell 330 and is centered 75% of the distance along the print cell. This dot is formed by causing a transition turning the print engine on at location 332 and a second transition turning the print engine off at location 333. Since the transitions can be placed at any of 256 locations in cell print area 330, area 331 can be as large or small as desired, and placed anywhere within the cell print area as desired, to reproduce as desired the incoming bitmap data representing that cell.

FIG. 13 is a representation of four input data pixels for a continuous tone image, such as a digital representation of a photograph, in which each pixel has a darkness value of between zero and one hundred. In the example shown, four input data pixels, 341 through 344, two each on two adjacent lines, represent one macrocell, or halftone dot print area, 340. The driver of this invention is configured to take in the four input data pixels and create therefrom a halftone dot comprising one or more cell print areas along the scan direction of the print engine, and two or more scan lines of the print engine in the vertical direction. The example of FIG. 13 illustrates two important concepts of this invention, the darkness and its center of gravity for input data pixels. As shown, the darkness of input pixel pair 341 and 342 is 60%, and its center of gravity two-thirds. The darkness of input pixel pair 343 and 344 is also 60%, but its center of gravity is three-quarters.

FIG. 14A illustrates an example in which the four input data pixels for macrocell 351 all have the same value of 50%. Accordingly, the darkness is 50% and the center of gravity one-half. Output macrocell 351a, FIG. 14B, includes vertically-aligned cell print areas 352 and 354, each 1/150 of an inch long and one scan line wide in the y direction, which together form halftone dot 353 having a darkness of 50% and a center of gravity of one-half, closely reproducing the input data for that macrocell area. The driver of this invention, however, is able to shift the center of gravity as desired in the horizontal or vertical direction to make from the input data pixels a desired halftone image. For example, macrocell 351b, FIG. 14C, has halftone dot 353a centered at ⅜, and a darkness of 50%. The horizontal shift is accomplished either in software or in hardware. In one embodiment, the driver computes the darkness of the center of gravity of the four input data pixels. The darkness is represented in the output by from zero to three transitions in each of the print cell areas making up the halftone dot macrocell; the time between the transitions establishes the darkness of the print area and the actual placement of the first transition within the area establishes the center of gravity of that darkness. The transition placement may be accomplished by computing a computed pair of data pixels for each print area on each scan line through the macrocell. These computed pixels are then applied to the lookup tables to generate the transition data bytes as described above.

A more schematic representation of a four-line halftone dot output in a larger macrocell area is shown in FIGS. 15A through 15C. In these examples, the driver is creating a halftone dot comprised of one or more cell print areas horizontally, and four print lines vertically as illustrated by the four horizontal dashed lines. The halftone dot is represented as in FIG. 3B by solid horizontal lines. FIG. 15A depicts a halftone dot centered in halftone dot macrocell area 355 and having a darkness of about 50%. FIG. 15B depicts the same 50% dot shifted to the right centered at about 75%. Typically, this shift is provided when the four input pixels have a displaced center of gravity and the computed data pixels have a center of gravity of 75% to accomplish the shifting. FIG. 15C depicts another type of center of gravity shifting in which the dot is skewed diagonally. In the example shown, the dot has a center of gravity of 50% but is skewed diagonally to reproduce data pixels having different centers of gravity. For example, if the halftone dot of FIG. 15C is made from four print cells, one in each of the four scan lines, and the center of gravity of the computed data pixels representing the top cell is greater than that of those representing the second cell, which is greater than that of those representing the third cell, which is greater than that of those representing the bottom cell, the center of gravity of the pairs of computed data pixels in effect moves from right to left as the print lines are traversed vertically. This may be reproduced as shown in FIG. 15C as described above in conjunction with FIG. 14.

FIGS. 16A through 16C depict a method of reproducing a bitmap and an outline edge of text passing through a print cell area nonvertically. FIG. 16A is a representation of a bit map representing an image edge. FIG. 16B shows outline edge 360 passing non-vertically through the cell area 361a. The driver of this invention is able to reproduce the amount of darkness in cell 361 and 361a and the horizontal center of gravity of that darkness to represent the bitmap or the outline edge to create an image which appears to be smoothed. This may be accomplished for example as shown in FIG.

16C by reproducing a different image in output print cell 361b, which is preferably 1/200 or 1/150 of an inch long horizontally and in the example shown is one scan line vertically. The image is reproduced by creating dark areas 366 and 368 with either two or three transitions depending on the state of the engine as it begins the scan of print cell 361b. The amount and center of gravity of the darkness within cell 361b is the same as that of input cell 361, but appears smooth to the eye. Since the transitions may be placed at any of 256 locations within cell 361b, the darkness is reproduced with a precision of eight bits and the horizontal center of gravity reproduced with a precision of eight bits. However, to use one byte instead of two, five bits can be used to establish the cell darkness and the remaining three its center of gravity.

In another embodiment for reproducing a bitmap image illustrated in FIG. 16D, the print cells are considered to overlap vertically by one line of input data as shown, and the input data is weighted dependent on its proximity to the center of a beam scan to closely approximate the image. For example, if the source image is dark along bitmap line 369 as shown, since the bits are included in both cells 1 and 2, the beam is turned on during the scans of both cells 1 and 2 to reproduce the image as desired.

Preferably, the bits of center line 368 of lines 367 through 369 making up cell print area 1 are weighted more than those of outer lines 367 and 369 because the beam is stronger at its center than at its edge. In other words, if the printer beam is centered in cell 1, it effectively travels down the middle of bitmap line 368. To account for the variation in the image darkness created by the beam profile, the driver in creating the zero, one, two or three transitions in cell 1 may weight the contributions of bits in line 368 more than those in lines 367 and 369 in computing the data which is applied to lookup tables to create the transition bytes.

FIG. 17A is a flow chart for a halftone dot position modulation process 400 using the print engine driver of this invention. In step 402, two adjacent data pixels from each of two data lines are taken in; in this embodiment the print engine driver reproduces two pairs of vertically-adjacent input data pixels with a halftone dot within a macrocell or halftone dot print area made up of one or more print cells on two or more adjacent scan lines, as shown in FIGS. 14 and 15, for example. If the image is to be sharpened, step 404, the differences between the input data pixels are exaggerated in of the horizontal and/or vertical dimension(s) as desired. Other, more computation-intensive, algorithms may be used to sharpen the input data. At step 408, a new pair of data pixels is computed for each vertical position (engine scan line) within the halftone dot, as supplied from step 410, as a vertically weighted average of the top and bottom input pixel pairs. For example, the computed pair of pixels may be weighted as 100% of the top input pixel pair for engine scan lines above the halftone dot center line, and 100% of the bottom input pixel pair below the dot center line. Alternatively, other weightings may be employed as desired.

In step 412, the darkness and center of gravity of each computed pair of data pixels is determined. The darkness is then used, step 414, along with the vertical position within the macrocell, to determine a segment of the halftone dot to be printed. That segment is then horizontally displaced based on the center of gravity of the computed pair of data pixels, step 416, to supply data used to compute the corresponding transitions for the single cell or adjacent cells on a scan line within the macrocell, step 418. If three transitions in a cell are desired, the first is put at the start of the cell by generating a "third transition" bit under software control and applying it to the modulator as described.

Preferably, some or all of steps 406, 408, 412, 414, 416 and 418 are accomplished using lookup tables. The vertical position within the halftone dot may be determined using the beam detect. In one embodiment, up to fifteen bits can be used to address the lookup tables; eight bits may be used to carry the sum of two input pixels horizontally. The sum indicates the level of gray (darkness). For embodiments in which two horizontally-adjacent print cells make up one scan line of a macrocell, a single bit may be used to indicate the current (left or right) cell. Two bits may then be used for the position of the scan line within the macrocell (up to four scan lines per macrocell). The remaining bits may be used for the difference between the input pixels, which is an indication of the center of gravity of a pixel pair. The sum and/or difference of two input data pixels may be easily computed in hardware.

The horizontal, vertical or diagonal displacement of the halftone dot may also be accomplished in the lookup tables; diagonal displacement is simply a special case where the horizontal displacement of the segment on each scan line of the macrocell is not the same.

FIG. 17B depicts flow chart 430 for text reproduction using the driver of this invention. In step 432, the system takes in the bitmap data bits for each print cell. For example, for 1/150 inch print cells and a 600×600 dpi bitmap, the system may take in four adjacent bits on three adjacent lines of bits, or twelve bits for each cell, in the case when cells overlap vertically by one line of the input bit map, such as shown in FIG. 16D. The system then computes the weighted cell darkness and center of gravity, step 434. At step 436 the system is caused to adjust the computations for engine/cartridge characteristics. For example, if the engine is known to print at a relatively dark level, the computed cell darkness ma be lightened to effectively reproduce as closely as possible the actual darkness or weighted darkness, as desired, of the bits representing the cell. At step 438, the transitions corresponding to the darkness and center of gravity for the cell are computed in light of the state of the print engine, i.e. whether the laser is on or off at the start of the cell scan. The transitions are then applied to modulator 440 as described above to generate the video signal applied to the engine. The modulator polarity signal fed back to step 438 may be accomplished with a wire off of flip flop 303, FIG. 10.

As with the dot position modulation of FIG. 17A, the functions of FIG. 17B may be accomplished in software or hardware, including lookup tables, or a combination thereof, as desired. In a preferred embodiment, most of the functions are accomplished in lookup tables which are computed once in advance by software that calculates the weighted cell darkness and center of gravity. In that case, the input bits may be applied directly to the lookup tables for creating the transition data signals applied to the modulator.

Although specific features of the invention are shown in some drawings and not others, this is for convenience only as each feature may be combined with any or all of the other features in accordance with the invention.

Other embodiments will occur to those skilled in the art and are within the following claims, for example the analog ramp signal may be replaced by a different variable signal such as an RC exponential or a triangle wave signal. In that case, it is simply necessary to configure the LUTs so that the analog transition signals occur at the proper time in relation to the variable comparison signal (e.g., the triangle wave), so that the transitions occur where desired.

What is claimed is:

1. A raster print engine driver for generating, from incoming data representative of an image, a transition-modulated engine drive signal for causing a print engine to reproduce the image as a series of modulated print lines, comprising:

means for establishing a cell scan time period representing a horizontal length along a print line of an elemental cell print area; and means for generating from the incoming data in said cell scan time period two independently located drive signal transitions to cause the print engine to change state at selected points along the print lines for closely reproducing the image said generating means also enabling a state of non-transition wherein no drive signal transition is produced to cause said print engine to change state.

2. The print engine driver of claim 1 in which said drive signal transitions are locatable with a precision of at least one sixty-fourth of said cell scan time period.

3. The print engine driver of claim 2 in which said drive signal transitions are locatable with a precision of approximately one two hundred fifty-sixth of said cell scan time period.

4. The print engine driver of claim 3 in which said cell print area is approximately one one hundred fiftieth of an inch long.

5. The print engine driver of claim 1 in which said print engine driver generates one of the cases of zero, one and two independently located drive signal transitions and the case of a third drive signal transition per cell.

6. The print engine driver of claim 1 in which said means for establishing a cell scan time period provides variable cell scan times to permit cell width scaling for changing an image size.

7. The print engine driver of claim 1 in which said means for generating includes a digital clock for providing clock signals having a clock period.

8. The print engine driver of claim 7 in which said means for generating further includes a plurality of delay means for generating from said clock signal a plurality of sequentially spaced clock phase signals having leading and trailing edges.

9. The print engine driver of claim 8 in which said means for generating further includes logic circuit means for generating, from said clock phase signals and the incoming data, drive signal transitions independently locatable within a clocking period.

10. The print engine driver of claim 9 in which said logic circuit means includes a digital counter for producing a digital ramp signal.

11. The print engine driver of claim 10 in which said logic circuit means further includes means for comparing the incoming data to said digital ramp signal to establish a drive signal transition time window within said cell scan time period.

12. The print engine driver of claim 11 in which said logic circuit means further includes means for selecting with the incoming data one of said clock phase signals to resolve a drive signal transition time within the established window.

13. The print engine driver of claim 12 in which said means for selecting includes means for choosing the leading or trailing edge of the selected clock phase signal to fully define the drive signal transition time.

14. The print engine driver of claim 9 in which at least one said delay means is accomplished with a propagation delay within said logic circuit means.

15. The print engine driver of claim 11 in which said means for establishing a cell scan time period includes means for providing variable cell scan times to permit cell width scaling for changing the image size.

16. The print engine driver of claim 15 in which said means for providing variable cell scan times includes means for resetting and restarting said digital ramp signal when said digital ramp signal reaches a selected value to end one cell scan time period and begin a next cell scan time period.

17. The print engine driver or claim 11 in which paid digital ramp is generated in gray code to prevent momentary false comparisons.

18. The print engine driver of claim 10 further including means for synchronizing the engine drive signal to the raster print engine horizontal synchronization signal.

19. The print engine driver of claim 18 in which said means for synchronizing includes means for resetting said digital counter at a horizontal synchronization signal time.

20. The print engine driver of claim 1 in which the incoming data is a digital representation of an image of text or line art.

21. The print engine driver of claim 20 in which said means for generating includes means for reproducing by drive signal transition placement the amount of image darkness within each cell print area.

22. The print engine driver of claim 21 in which said means for generating includes means for reproducing by drive signal transition placement the horizontal center of gravity of the image darkness within each cell print area.

23. The print engine driver of claim 22 in which at least some of said cell print areas overlap vertically.

24. The print engine driver of c aim 23 in which the image darkness in the cell print area overlapping areas are reproduced in both overlapping cell print areas.

25. The print engine driver of claim 20 in which said digital representation includes a bitmap having a resolution twice that of the resolution of the raster print engine.

26. The print engine driver of claim 25 in which the transitions in a cell print area are generated from parts of three adjacent horizontal lines of said bitmap.

27. The print engine driver of claim 26 in which said means for generating includes means for weighting bits of the parts of the three horizontal lines of said bitmap from which the transitions in the cell print area are generated.

28. The print engine driver of claim 27 in which bits of the central bitmap line are weighted more than bits of an outer bitmap lines of the three horizontal lines of said bitmap from which the transitions in a cell print area are generated.

29. The print engine driver of claim 22 in which the incoming data includes data representative of image outline edges.

30. The print engine driver of claim 29 in which said means for generating includes means for determining when an image outline edge passes non-vertically through a cell print area.

31. The print engine driver of claim 30 in which said means for generating generates at least two drive signal transitions to represent a non-vertical outline edge passing through a cell print area.

32. A raster print engine driver for reproducing a text or line art image from incoming data representative of the image, in which the reproduced image has an apparent vertical resolution greater than that of the print engine, comprising:
- means for establishing a cell scan time period representing an elemental cell print area of at least 0.005" in length; and
- means for driving an print engine to reproduce in a cell print area the amount of image darkness in the cell print area with an accuracy of at least five bits and the horizontal center of gravity of the image darkness in the cell print area with an accuracy of at least three bits.

33. A raster print engine driver for generating, from incoming data pixels representative of a continuous tone image, a transition-modulated engine drive signal for causing a print engine to reproduce the image as a series of modulated print lines forming position-modulated halftone dots, comprising:
- means for establishing a halftone dot print area including a pair of input data pixels on each of two different input data lines; and
- means said two pairs of generating, from four input data pixels in said halftone dot print area, a plurality of independently located drive signal transitions to cause the print engine to change state at selected points in said halftone dot print area to produce a halftone dot from said four input data pixels.

34. The print engine driver of claim 33 in which said means for generating produces a halftone dot centered in said print area when the value of each of the four input data pixels is the same.

35. The print engine driver of claim 33 in which said means for generating produces a halftone dot displaced vertically or horizontally from the center of said print area when a center of gravity of the four input data pixels is not centered in said print area.

36. The print engine driver of claim 33 in which said means for generating produces a halftone dot distorted diagonally within said print area when the center of gravity of the pair of input data pixels from the top input data line is different than that of the pair of input data pixels from the bottom input data line.

37. The print engine driver of claim 33 in which said means for generating includes means for creating a computed pair of data pixels for each engine scan line through said halftone dot print area.

38. The print engine driver of claim 37 in which said computed pair of data pixels is based on a weighted average of values of both pairs of input data pixels for a halftone dot print area, in which the weighting for the weighted average is determined by the vertical position within the halftone dot print area of the engine scan line.

39. The print engine driver of claim 38 in which said weighting is one hundred percent of the upper pair of input pixels for scan lines above the center of the halftone dot print area and one hundred percent of the lower pair of input pixels for scan lines below the center of the halftone dot print area.

40. The print engine driver of claim 33 in which said means for generating includes means for altering a value of at least one of said four input data pixels to sharpen said reproduced image.

41. The print engine driver of claim 40 in which said means for altering includes means for exaggerating differences in value among the four input data pixels in at least one dimension.

42. The print engine driver of claim 33 in which said print engine driver generates one of at least the cases of zero and two independently located drive signal transitions from each pair of input data pixels.

43. The print engine driver of claim 37 in which said means for generating includes a lookup table for storing data representative of the drive signal transitions.

44. The print engine driver of claim 43 in which said lookup table is addressed with at least one of the sum and the difference of the values of the computed pair of data pixels.

45. The print engine driver of claim 37 in which said means for generating includes means for averaging each pair of computed data pixels to determine the density of the portion of the halftone dot on that engine scan line.

46. The print engine driver of claim 45 in which said means for generating further includes means for horizontally displacing said portion of the halftone dot to reproduce the center of gravity of the computed pair of data pixels.

* * * * *